US012139966B2

(12) United States Patent
Huang et al.

(10) Patent No.: US 12,139,966 B2
(45) Date of Patent: Nov. 12, 2024

(54) WINDOW SHADE AND ACTUATING SYSTEM THEREOF

(71) Applicant: Teh Yor Co., Ltd., New Taipei (TW)

(72) Inventors: Chung-Chen Huang, New Taipei (TW); Kuan-Yu Liu, New Taipei (TW)

(73) Assignee: TEH YOR CO., LTD., New Taipei (TW)

( * ) Notice: Subject to any disclaimer, the term of this patent is extended or adjusted under 35 U.S.C. 154(b) by 167 days.

(21) Appl. No.: 17/820,655

(22) Filed: Aug. 18, 2022

(65) Prior Publication Data

US 2023/0086941 A1 Mar. 23, 2023

Related U.S. Application Data

(60) Provisional application No. 63/246,987, filed on Sep. 22, 2021.

(51) Int. Cl.

| | |
|---|---|
| ***E06B 9/307*** | (2006.01) |
| ***E06B 9/262*** | (2006.01) |
| ***E06B 9/323*** | (2006.01) |

(52) U.S. Cl.

CPC .............. *E06B 9/307* (2013.01); *E06B 9/262* (2013.01); *E06B 9/323* (2013.01); *E06B 2009/2625* (2013.01)

(58) Field of Classification Search

CPC .......... E06B 9/322; E06B 9/262; E06B 9/307; E06B 9/323; E06B 2009/2627; E06B 2009/2625; E06B 2009/3222

See application file for complete search history.

(56) References Cited

U.S. PATENT DOCUMENTS 5,890,529 A * 4/1999 Haarer ...................... E06B 9/78
192/48.92
6,112,800 A 9/2000 Marusak
(Continued)

FOREIGN PATENT DOCUMENTS

CN 101349309 A 1/2009
JP 2021-4543 A 1/2021
(Continued)

OTHER PUBLICATIONS

International Search Report in the parent PCT application No. PCT/US2022/075113, dated Dec. 7, 2022.
(Continued)

*Primary Examiner* — Johnnie A. Shablack
(74) *Attorney, Agent, or Firm* — Chen Yoshimura LLP

(57) ABSTRACT

An actuating system for a window shade includes an axle coupling part rotatable for raising and lowering a movable rail of the window shade, a braking part and a brake coupling part connected with each other, the braking part being adapted to apply a braking force on the brake coupling part for preventing rotation of the brake coupling part, a lift actuating module including a spool connected with an operating part, the spool being rotatable in a winding direction to wind the operating part and in an unwinding direction to unwind the operating part, and a clutching mechanism including two clutching parts movable relative to the brake coupling part and the spool to selectively couple the axle coupling part to either one of the spool and the brake coupling part.

20 Claims, 28 Drawing Sheets

(56) References Cited

U.S. PATENT DOCUMENTS

| | | | | |
|---|---|---|---|---|
| 6,129,131 | A * | 10/2000 | Colson | E06B 9/262 160/171 |
| 6,142,211 | A * | 11/2000 | Judkins | E06B 9/90 160/319 |
| 7,128,126 | B2 * | 10/2006 | Smith | E06B 9/262 160/84.05 |
| 7,665,507 | B2 * | 2/2010 | Naoki | E06B 9/78 160/170 |
| 8,186,413 | B2 * | 5/2012 | Fujita | E06B 9/34 160/319 |
| 8,342,309 | B2 * | 1/2013 | Takagi | E06B 9/322 192/223.4 |
| 8,356,653 | B2 * | 1/2013 | Fu-Lai | E06B 9/322 160/84.05 |
| 8,844,605 | B2 * | 9/2014 | Ng | E06B 9/78 192/81 C |
| 9,062,492 | B2 * | 6/2015 | Yu | E06B 9/322 |
| 9,187,951 | B2 * | 11/2015 | Yu | E06B 9/90 |
| 9,284,774 | B2 * | 3/2016 | Yu | E06B 9/322 |
| 9,341,020 | B1 * | 5/2016 | Kao | E06B 9/262 |
| 9,528,318 | B2 * | 12/2016 | Huang | E06B 9/262 |
| 9,605,477 | B2 * | 3/2017 | Huang | E06B 9/322 |
| 9,657,517 | B2 * | 5/2017 | Huang | E06B 9/32 |
| 9,765,864 | B2 * | 9/2017 | Yu | E06B 9/78 |
| 9,890,588 | B2 * | 2/2018 | Smith | E06B 9/26 |
| 9,938,764 | B2 * | 4/2018 | Huang | F16H 3/54 |
| 11,448,009 | B2 * | 9/2022 | Otsuka | E06B 9/262 |
| 11,598,145 | B2 * | 3/2023 | Huang | E06B 9/322 |
| 11,767,712 | B2 * | 9/2023 | Huang | E06B 9/322 160/84.02 |
| 11,859,447 | B2 * | 1/2024 | Brown | E06B 9/06 |
| 11,879,294 | B2 * | 1/2024 | Huang | E06B 9/322 |
| 2004/0226663 | A1 * | 11/2004 | Smith | E06B 9/68 160/84.05 |
| 2009/0120592 | A1 | 5/2009 | Lesperance | |
| 2009/0120593 | A1 * | 5/2009 | Lesperance | E06B 9/322 160/84.02 |
| 2009/0242332 | A1 * | 10/2009 | Anderson | E06B 9/262 242/421 |
| 2012/0048485 | A1 | 3/2012 | Fu-Lai et al. | |
| 2013/0220561 | A1 * | 8/2013 | Yu | E06B 9/78 160/405 |
| 2014/0216668 | A1 * | 8/2014 | Kim | E06B 9/42 160/322 |
| 2016/0017964 | A1 * | 1/2016 | Yu | E06B 9/32 160/168.1 P |
| 2016/0138331 | A1 * | 5/2016 | Huang | E06B 9/322 160/189 |
| 2023/0313605 | A1 * | 10/2023 | Huang | E06B 9/326 160/84.01 |
| 2024/0052694 | A1 * | 2/2024 | Huang | E06B 9/322 |
| 2024/0052695 | A1 * | 2/2024 | Huang | E06B 9/262 |
| 2024/0052696 | A1 * | 2/2024 | Huang | E06B 9/322 |

FOREIGN PATENT DOCUMENTS

| | | |
|---|---|---|
| JP | 2021-55484 A | 4/2021 |
| TW | 201335475 A | 9/2013 |

OTHER PUBLICATIONS

Written Opinion in the parent PCT application No. PCT/US2022/075113, dated Dec. 7, 2022.

Taiwanese Office Action, dated Feb. 15, 2023, in a counterpart Taiwanese patent application, No. TW 111131123. (English translation of the search report is appended after the Chinese language document in the same PDF.).

* cited by examiner

WINDOW SHADE AND ACTUATING SYSTEM THEREOF

CROSS-REFERENCE TO RELATED APPLICATION(S)

This application claims priority to U.S. provisional patent application No. 63/246,987 filed on Sep. 22, 2021, the disclosure of which is hereby incorporated by reference.

BACKGROUND

1. Field of the Invention

The present invention relates to window shades, and actuating systems used in window shades.

2. Description of the Related Art

Some window shades may use an operating cord for raising a bottom part of the window shade and a wand for lowering the bottom part. More specifically, the operating cord may be pulled downward to drive a rotary part in rotation, which can be transmitted to a drive axle so that the drive axle can rotate for winding a suspension cord connected with the bottom part. When a user rotates the wand, an arrester coupled to the wand can release the drive axle, which can accordingly rotate as the bottom part lowers under gravity action.

In the aforementioned type of window shades, the braking force of the arrester may create resistance against the rotation of the drive axle when the rotary part and the drive axle rotate for raising the bottom part. As a result, the pulling force applied by the user has to overcome the braking force to be able to raise the bottom part, which may require increased effort from the user.

SUMMARY

The present application describes a window shade and an actuating system for use with the window shade that can reduce internal friction so that component wear can be reduced and the actuating system can be operated with reduced effort.

According to an embodiment, an actuating system for a window shade includes an axle coupling part rotatable for raising and lowering a movable rail of a window shade, a braking part and a brake coupling part connected with each other, the braking part being adapted to apply a braking force on the brake coupling part for preventing rotation of the brake coupling part, a lift actuating module including a spool connected with an operating part, the spool being rotatable in a winding direction to wind the operating part and in an unwinding direction to unwind the operating part, and a clutching mechanism including two clutching parts movable relative to the brake coupling part and the spool to selectively couple the axle coupling part to either one of the spool and the brake coupling part. The spool and the axle coupling part are concurrently rotatable relative to the brake coupling part when the axle coupling part is decoupled from the brake coupling part and coupled to the spool, and the braking force of the braking part is adapted to prevent a rotation of the axle coupling part when the axle coupling part is coupled to the brake coupling part and decoupled from the spool.

Moreover, the application describes embodiments of window shades that can incorporate the actuating system.

DETAILED DESCRIPTION OF THE EMBODIMENTS

Figure 1:
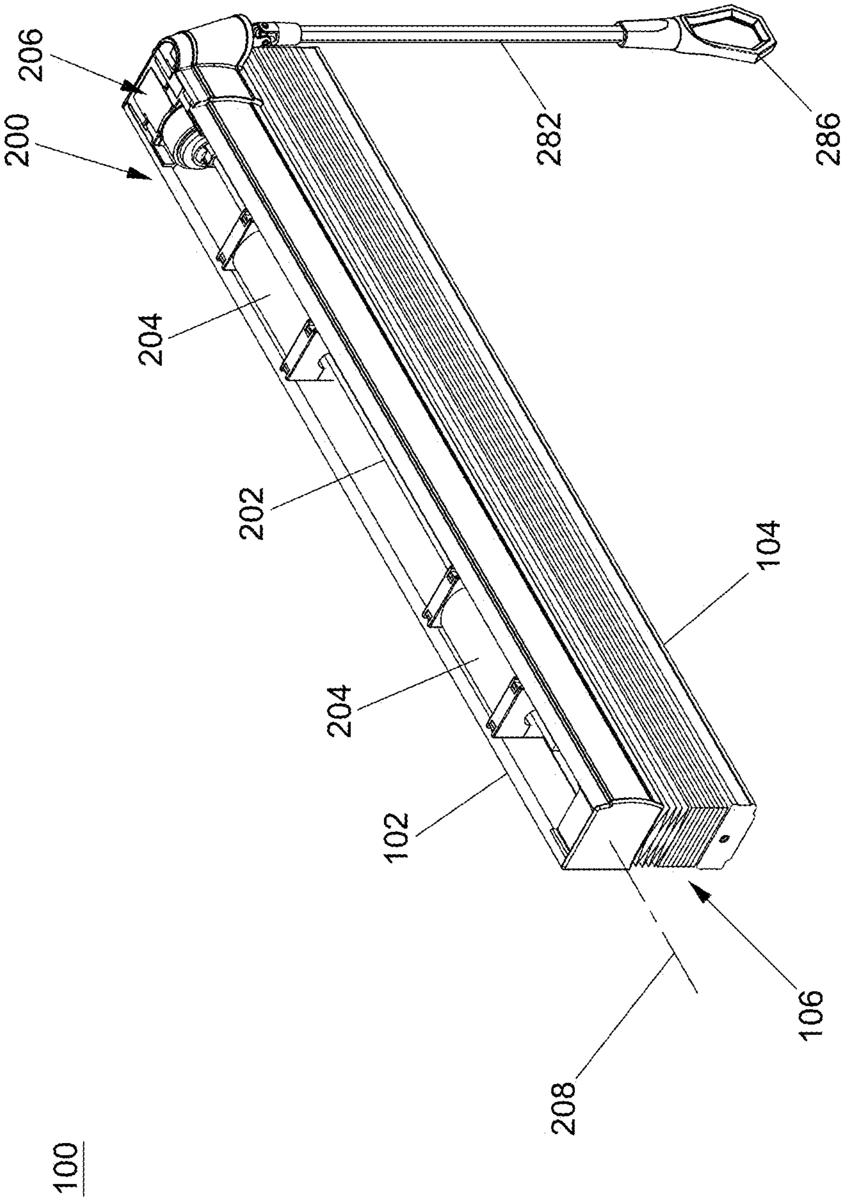
FIG. 1 is a perspective view illustrating an embodiment of a window shade.
Figure 2:
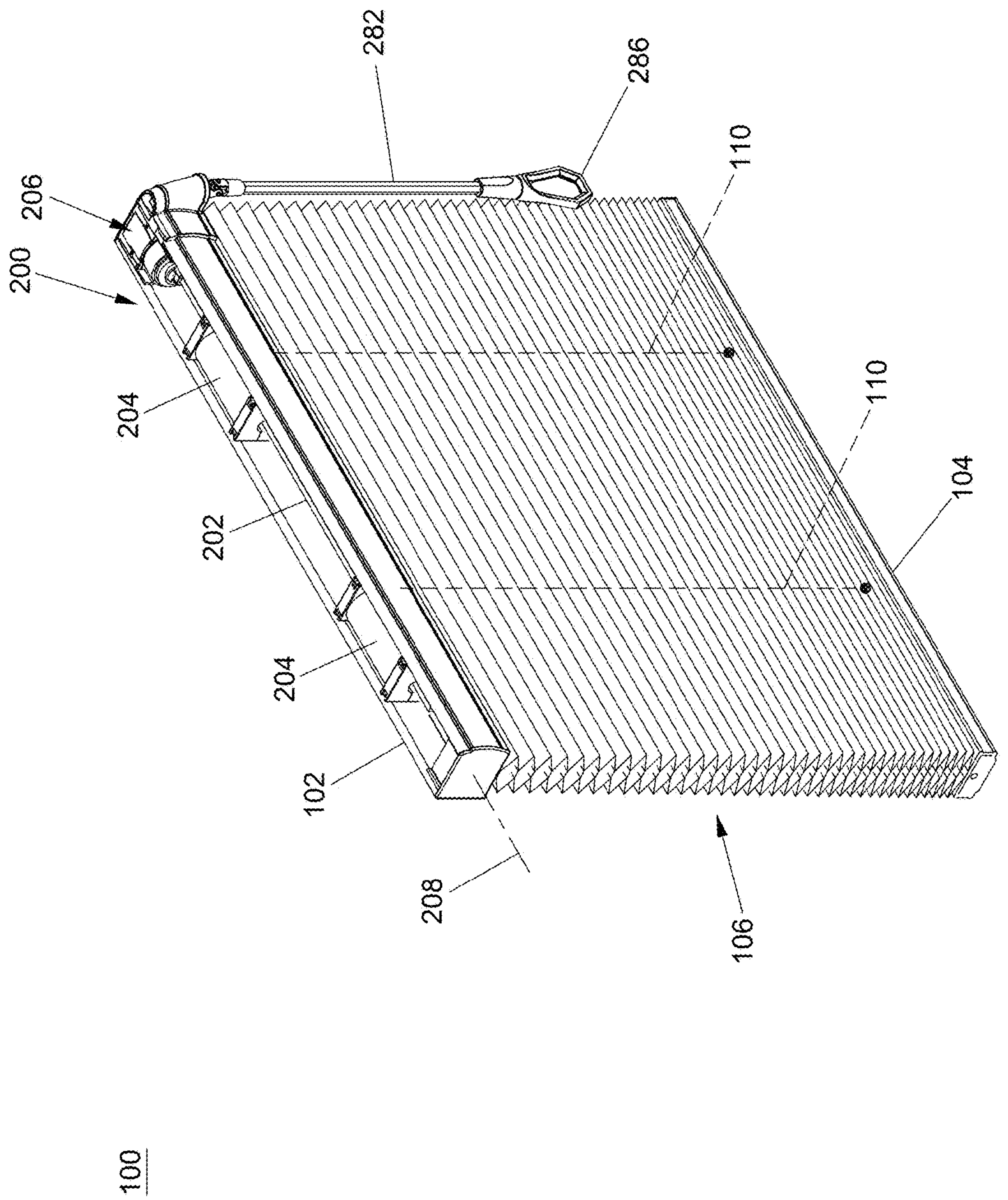
FIG. 2 is a perspective view illustrating the window shade of FIG. 1 having a movable rail lowered from a head rail.

FIGS. 1 and 2 are perspective views illustrating an embodiment of a window shade 100 in different states.

Referring to FIGS. 1 and 2, the window shade 100 can include a head rail 102, a movable rail 104, a shading structure 106 and an actuating system 200. The window shade 100 is shown in a retracted or raised state in FIG. 1, and in an expanded or lowered state in FIG. 2.

The head rail 102 may be affixed at a top of a window frame, and can have any desirable shapes. According to an example of construction, the head rail 102 can have an elongate shape including a cavity for at least partially receiving the actuating system 200 of the window shade 100.

The movable rail 104 can be suspended from the head rail 102 with a plurality of suspension elements 110 (shown with phantom lines in FIG. 2). According to an example of construction, the movable rail 104 may be an elongate rail having a channel adapted to receive to the attachment of the shading structure 106. Examples of the suspension elements 110 may include, without limitation, cords, strips, bands, and the like. According to an example, the movable rail 104 may be a bottom rail of the window shade 100. However, it will be appreciated that other shade elements may be provided below the movable rail 104 as needed.

The shading structure 106 may have any suitable structure that can be expanded and collapsed between the head rail 102 and the movable rail 104. According to an example of construction, the shading structure 106 can have a cellular structure, which may include, without limitation, honeycomb structures. During use, the shading structure 106 can be suspended from the head rail 102, and can be expanded or collapsed by displacing the movable rail 104 away from or toward the head rail 102.

Referring to FIGS. 1 and 2, the movable rail 104 can move vertically relative to the head rail 102 for setting the window shade 100 to a desirable configuration. For example, the movable rail 104 may be raised toward the head rail 102 to collapse the shading structure 106 as shown in FIG. 1, or lowered away from the head rail 102 to expand the shading structure 106 as shown in FIG. 2. The vertical position of the movable rail 104 relative to the head rail 102 may be controlled with the actuating system 200.

Referring to FIGS. 1 and 2, the actuating system 200 is assembled with the head rail 102, and is operable to displace the movable rail 104 relative to the head rail 102 for adjustment. The actuating system 200 can include a transmission axle 202, a plurality of winding units 204 rotationally coupled to the transmission axle 202, and a control module 206 coupled to the transmission axle 202.

The transmission axle 202 and the winding units 204 can be assembled with the head rail 102. The transmission axle 202 is respectively coupled to the winding units 204, and can rotate about a longitudinal axis 208. Each of the winding units 204 is respectively connected with the movable rail 104 via at least one suspension element 110, and is operable to wind the suspension element 110 for raising the movable rail 104 and to unwind the suspension element 110 for lowering the movable rail 104. For example, the winding unit 204 may include a rotary drum (not shown) that is rotationally coupled to the transmission axle 202 and is connected with one end of the suspension element 110, and another end of the suspension element 110 can be connected with the movable rail 104, whereby the rotary drum can rotate along with the transmission axle 202 to wind or unwind the suspension element 110. Since the winding units 204 are commonly coupled to the transmission axle 202, the winding units 204 can operate in a concurrent manner for winding and unwinding the suspension elements 110.

The control module 206 is coupled to the transmission axle 202, and is operable to cause the transmission axle 202 to rotate in either direction about the longitudinal axis 208 for raising or lowering the movable rail 104. In conjunction with FIGS. 1 and 2, FIG. 3 is an exploded view illustrating a construction of the control module 206, and FIG. 4 is a cross-sectional view of the control module 206.

Referring to FIGS. 1-4, the control module 206 can include a housing 210 that can be affixed to the head rail 102. The housing 210 can have a cavity 210A adapted to receive at least some component parts of the control module 206. According to an example of construction, the housing 210 may include two casing portions 212A and 212B that are attached to each other to define at least partially the cavity 210A, and a cover 212C and a bracket 212D that may be affixed to the casing portion 212A to close the cavity 210A at one side thereof. FIG. 5 is a perspective view illustrating the control module 206 without a portion of the housing 210 to better show inner construction details of the control module 206.

Figure 3:
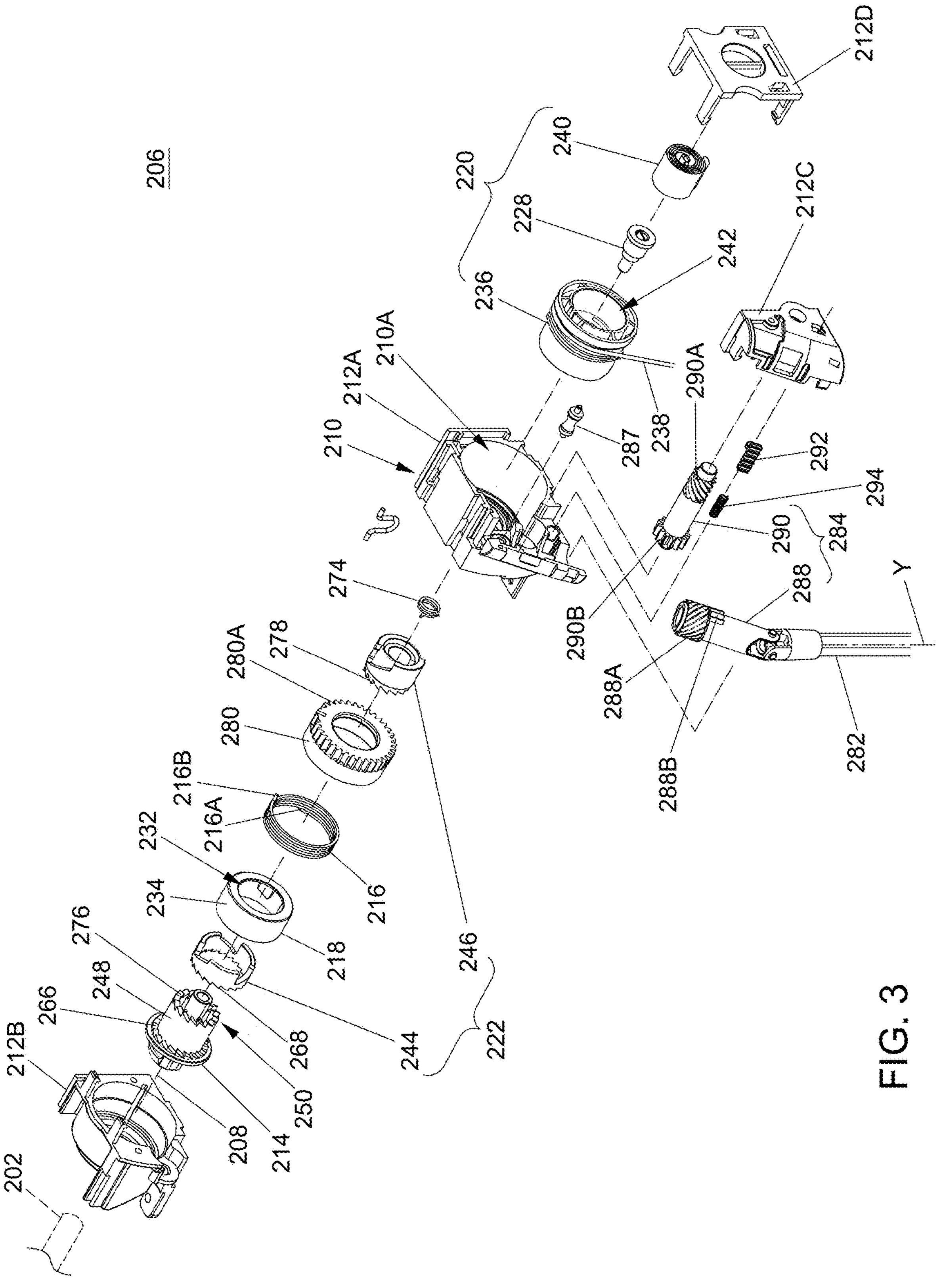
FIG. 3 is an exploded view illustrating the construction of a control module provided in an actuating system for a window shade.
Figure 4:
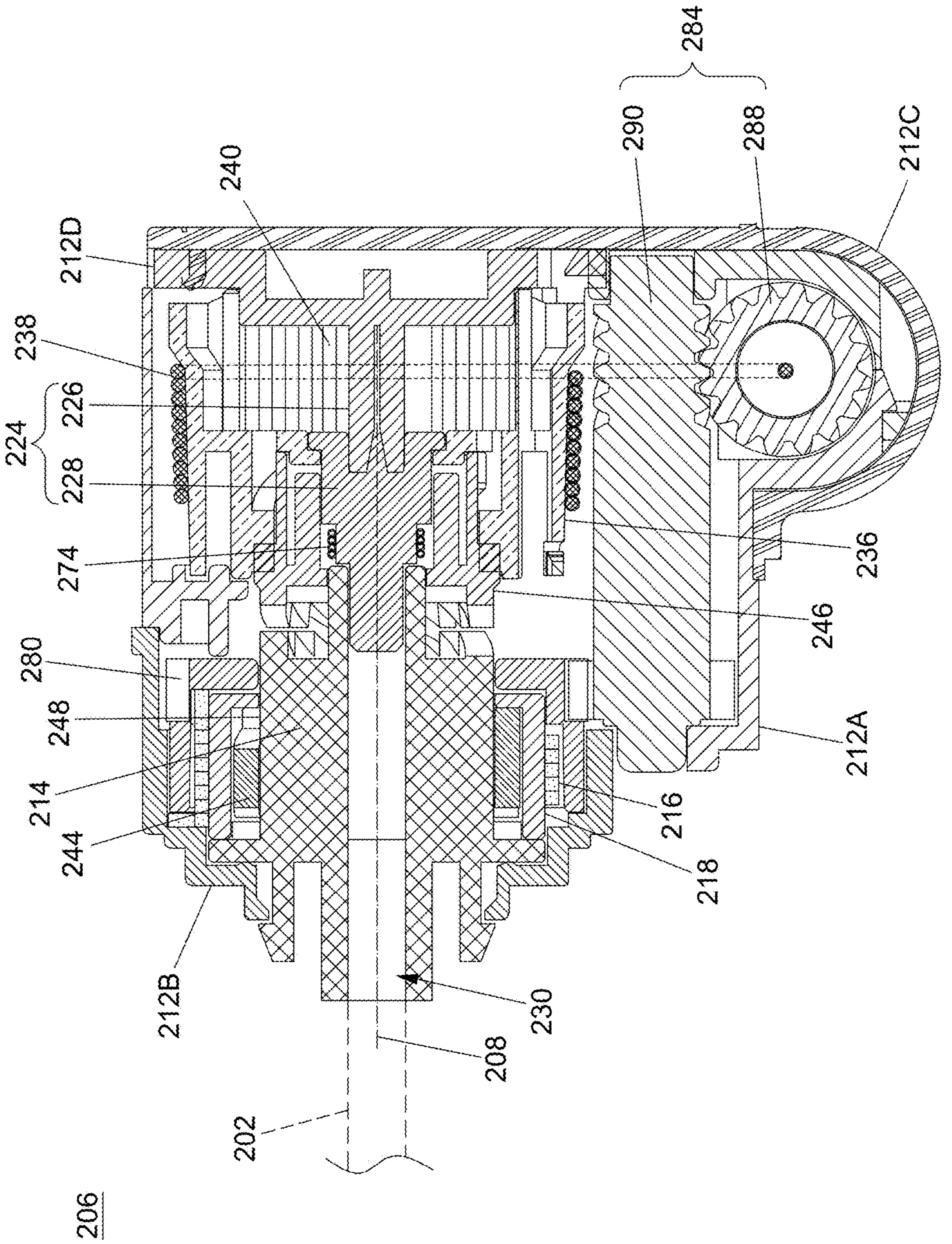
FIG. 4 is a cross-sectional view of the control module shown in FIG. 3.
Figure 5:
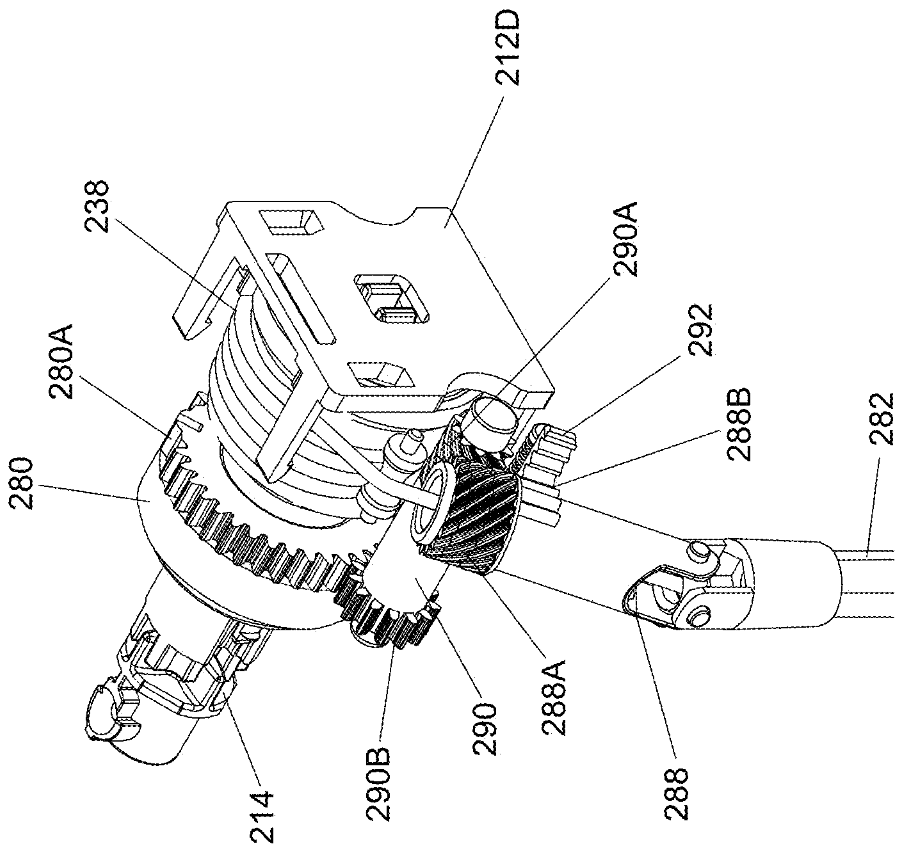
FIG. 5 is a perspective view illustrating the control module of FIG. 4 without a portion of the housing thereof.
Figure 6:
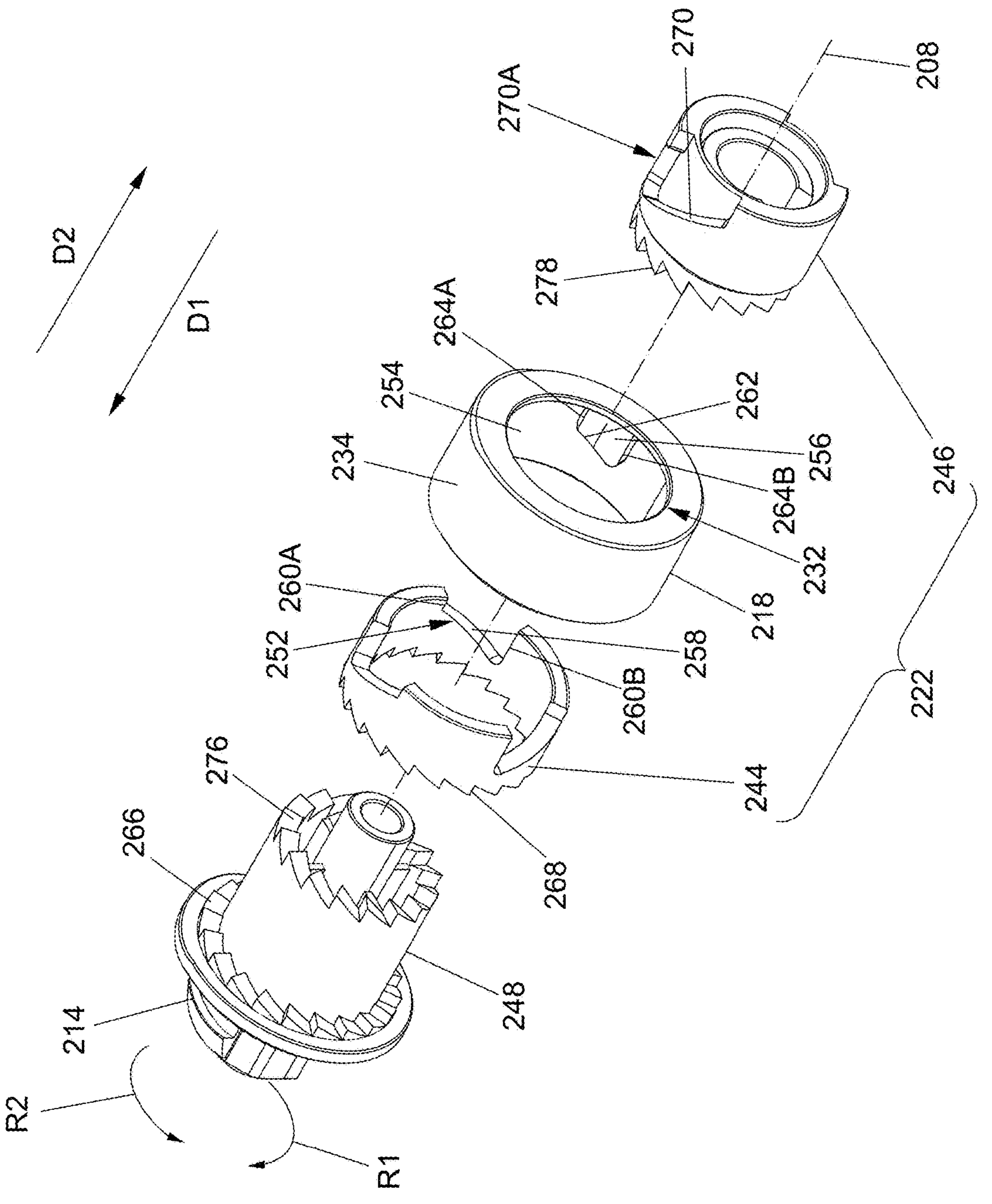
FIG. 6 is an exploded view illustrating some construction details of a clutching mechanism provided in the control module.

Referring to FIGS. 3-5, the control module 206 can include an axle coupling part 214, a braking part 216, a brake coupling part 218, a lift actuating module 220 and a clutching mechanism 222, all of which can be assembled with the housing 210. For facilitating the assembly of the different component parts, the housing 210 can include a fixed shaft 224 having multiple sections of different sizes. According to an example of construction, the fixed shaft 224 can include a lug 226 fixedly connected with the bracket 212D, and a shaft portion 228 fixedly attached to the lug 226. The lug 226 and the shaft portion 228 can be substantially coaxial to the longitudinal axis 208. It will be appreciated that the lug 226 and the shaft portion 228 may also be provided as a single part, which can be attached to or formed integrally with the bracket 212D.

The axle coupling part 214 can be received at least partially inside the cavity 210A of the housing 210, and can extend outward through the casing portion 212B. According to an example of construction, the axle coupling part 214 may be provided as a unitary part of an elongate shape. The axle coupling part 214 may be pivotally connected about the fixed shaft 224 with the shaft portion 228 thereof inserted into a hole 230 provided in the axle coupling part 214.

The axle coupling part 214 is rotationally coupled to the transmission axle 202 so that the transmission axle 202 and the axle coupling part 214 can rotate in unison about the longitudinal axis 208 relative to the housing 210. For example, an end of the transmission axle 202 can be inserted into the hole 230 at a side of the axle coupling part 214 opposite to the fixed shaft 224. A fastener (not shown) may be used to securely attach the transmission axle 202 to the axle coupling part 214. Accordingly, the axle coupling part 214 can be rotationally coupled to the winding units 204 via the transmission axle 202, and the transmission axle 202 and the axle coupling part 214 can rotate in unison about the longitudinal axis 208 for raising and lowering the movable rail 104.

The braking part 216 is adapted to apply a braking force for preventing rotation of the brake coupling part 218. According to an example of construction, the braking part 216 and the brake coupling part 218 are disposed around the longitudinal axis 208 and are connected with each other. For example, the brake coupling part 218 can have a hollow interior 232 and can be disposed around an intermediate portion of the axle coupling part 214, which passes through the hollow interior 232 leaving a gap between the intermediate portion of the axle coupling part 214 and the brake coupling part 218. During operation, the axle coupling part 214 thus can rotate relative to the brake coupling part 218.

The braking part 216 can be disposed around the brake coupling part 218 in contact with an outer surface 234 thereof, and can apply a braking force on the brake coupling part 218 for preventing rotation of the brake coupling part 218 about the longitudinal axis 208. For example, the outer surface 234 may be defined on a ring portion of the brake coupling part 218, and the braking part 216 can include a wrap spring mounted around the ring portion of the brake coupling part 218 in frictional contact with the outer surface 234. The braking part 216 can apply a braking force on the brake coupling part 218 via the frictional contact between the braking part 216 and the outer surface 234 of the brake coupling part 218.

Referring to FIGS. 3-5, the lift actuating module 220 can include a spool 236 connected with an operating part 238, and a spring 240 connected with the spool 236. The operating part 238 can be a flexible element of a linear shape, and can have an end anchored to the spool 236. Examples of the operating part 238 can include, without limitation, a cord or a tape. The spool 236 is pivotally connected with the housing 210, and is rotatable in a winding direction to wind the operating part 238 and in an unwinding direction to unwind the operating part 238. According to an example of construction, the spool 236 may be pivotally connected around the fixed shaft 224, whereby the spool 236 can rotate about the longitudinal axis 208 for winding and unwinding the operating part 238.

The spring 240 is connected with the spool 236, and is adapted to bias the spool 236 to rotate in the winding direction. According to an example of construction, the spool 236 can have a cavity 242 through which passes the fixed shaft 224, and the spring 240 can be disposed around the fixed shaft 224 inside the cavity 242 with two ends of the spring 240 being respectively connected with the fixed shaft 224 (e.g., at the lug 226) and the spool 236. The lift actuating module 220 may be operable to raise the movable rail 104 by pulling the operating part 238 so that the spool 236 rotates in the unwinding direction. When the operating part 238 is released, the spring 240 can urge the spool 236 to rotate for winding at least partially the operating part 238.

The clutching mechanism 222 is configured to selectively couple the axle coupling part 214 to either one of the lift actuating module 220 and the brake coupling part 218, wherein the clutching mechanism 222 is operable to couple the axle coupling part 214 to the spool 236 of the lift actuating module 220 and decouple the axle coupling part 214 from the brake coupling part 218 in response to a rotation of the spool 236 in the unwinding direction, and decouple the axle coupling part 214 from the spool 236 and couple the axle coupling part 214 to the brake coupling part 218 when the spool 236 rotates in the winding direction. Accordingly, the axle coupling part 214 and the spool 236 can concurrently rotate relative to the brake coupling part 218 free of the braking force applied by the braking part 216, when the spool 236 rotates in the unwinding direction. This may facilitate raising of the movable rail 104 and reduce friction between component parts. When the spool 236 rotates in the winding direction, the braking force of the braking part 216 can be exerted through the brake coupling part 218 and the clutching mechanism 222 to the axle coupling part 214, and thus is adapted to prevent a rotation of the axle coupling part 214. The movable rail 104 can be thereby held at a desired position relative to the head rail 102. As described hereinafter, the clutching mechanism 222 can include two clutching parts 244 and 246 that are movable relative to the brake coupling part 218 and the spool 236 to selectively couple the axle coupling part 214 to either one of the spool 236 and the brake coupling part 218.

In conjunction with FIGS. 3-5, FIG. 6 is an exploded view illustrating some construction details of the clutching mechanism 222. Referring to FIGS. 3-6, the brake coupling part 218 and the clutching part 244 can be disposed around an intermediate portion 248 of the axle coupling part 214, and the other clutching part 246 can be disposed adjacent to an end 250 of the axle coupling part 214. The clutching part 244 can be coupled to the brake coupling part 218, and is movable relative to the axle coupling part 214 and the brake coupling part 218 between a disengaged position where the clutching part 244 is disengaged from the axle coupling part 214 and an engaged position where the clutching part 244 is engaged with the axle coupling part 214. The clutching part 246 can be coupled to the spool 236, and is movable relative to the axle coupling part 214 and the spool 236 between a disengaged position where the clutching part 246 is disengaged from the axle coupling part 214 and an engaged position where the clutching part 246 is engaged with the axle coupling part 214.

The controlled movements of the two clutching parts 244 and 246 allow to switch the coupling state of the axle coupling part 214 with respect to the brake coupling part 218 and the spool 236 of the lift actuating module 220. More specifically, the clutching mechanism 222 is configured so that a rotation of the spool 236 in the unwinding direction causes the clutching part 246 to move to the engaged position and causes the clutching part 244 to move to the disengaged position, whereby the spool 236, the axle coupling part 214 and the clutching part 246 are concurrently rotatable relative to the brake coupling part 218. Moreover, the clutching mechanism 222 is configured so that a rotation of the spool 236 in the winding direction causes the clutching part 246 to move to the disengaged position, and the clutching part 244 can be switched to the engaged position while the clutching part 246 is disengaged from the axle coupling part 214 so that the braking force of the braking part 216 is adapted to prevent a rotation of the axle coupling part 214.

Each of the clutching parts 244 and 246 may be a single movable part. According to an example of construction, the two clutching parts 244 and 246 are configured to slide along the longitudinal axis 208 in opposite directions to selectively couple the axle coupling part 214 to either one of the spool 236 and the brake coupling part 218. For example, the clutching part 244 can have a ring shape, and the intermediate portion 248 of the axle coupling part 214 can be disposed through the clutching part 244 so that the clutching part 244 can slide along the intermediate portion 248 relative to the axle coupling part 214. The clutching part 246 can likewise have a ring shape, and can be disposed to slide along the shaft portion 228 of the fixed shape 224.

Referring to FIGS. 3-6, the clutching part 244 is coupled to the brake coupling part 218, and is movable between the disengaged position and the engaged position in sliding contact with the brake coupling part 218. According to an example of construction, the clutching part 244 can be disposed around the intermediate portion 248 of the axle coupling part 214 and at least partially received in the hollow interior 232 of the brake coupling part 218. The connection between the brake coupling part 218 and the clutching part 244 allows a limited displacement of the clutching part 244 relative to the brake coupling part 218 between the disengaged position and the engaged position. To this end, the clutching part 244 can be in sliding contact with the brake coupling part 218 inside the hollow interior 232 via at least one ramp surface provided on the clutching part 244 or the brake coupling part 218. For example, the clutching part 244 can have a notch 252 disposed eccentric from the longitudinal axis 208, and an inner wall 254 of the brake coupling part 218 at least partially delimiting the hollow interior 232 thereof can have a protrusion 256 that is restricted to slide within the notch 252. The notch 252 of the clutching part 244 can include a ramp surface 258 extending between two stop surfaces 260A and 260B, the protrusion 256 of the brake coupling part 218 can have a ramp surface 262 extending between two stop surfaces 264A and 264B, and the clutching part 244 can be disposed with the ramp surface 258 in sliding contact with the ramp surface 262.

With the aforementioned construction, the clutching part 244 can move relative to the brake coupling part 218 between the disengaged position and the engaged position with the ramp surface 258 in sliding contact with the ramp surface 262. More specifically, the clutching part 244 can concurrently rotate about and slide along the longitudinal axis 208 for switching between the disengaged position and the engaged position, the protrusion 256 of the brake coupling part 218 being displaced between the two stop surfaces 260A and 260B of the notch 252 during the movement of the clutching part 244 relative to the brake coupling part 218. When the clutching part 244 is in the disengaged position, the axle coupling part 214 is rotatable about the longitudinal axis 208 while the brake coupling part 218 and the clutching part 244 remain generally stationary. When the clutching part 244 is in the engaged position, the axle coupling part 214 and the clutching part 244 can be rotationally coupled to each other, and the braking force applied by the braking part 216 on the brake coupling part 218 is adapted to prevent a rotation of the axle coupling part 214 and the clutching part 244 via a contact between the stop surface 260A of the clutching part 244 and the stop surface 264A of the brake coupling part 218.

Referring to FIGS. 3-6, the axle coupling part 214 can include a plurality of teeth 266 disposed around the longitudinal axis 208, and the clutching part 244 can include a plurality of teeth 268 disposed around the longitudinal axis 208. The teeth 268 can be engaged with the teeth 266 when the clutching part 244 is in the engaged position, and disengaged from the teeth 266 when the clutching part 244 is in the disengaged position. The teeth 266 may be disposed along a first circumference of the axle coupling part 214 at an end of its intermediate portion 248, and the teeth 268 may disposed along a circular edge of the clutching part 244 that extends around the intermediate portion 248 facing the teeth 266 of the axle coupling part 214. The teeth 266 and 268 may have a saw-tooth pattern. When the clutching part 244 is in the engaged position, the engagement between the teeth 266 and 268 allows torque transmission from the axle coupling part 214 to the clutching part 244 in only one direction R1 and allows rotation of the axle coupling part 214 relative to the clutching part 244 in a direction R2 opposite to the direction R1. The direction R1 corresponds to a direction of rotation that would move the stop surface 260A of the clutching part 244 toward the stop surface 264A of the brake coupling part 218. A torque in the direction R1 can be created by the suspended load of the movable rail 104. When the clutching part 244 is in the engaged position, the braking force of the braking part 216 can oppose a torque in the direction R1 to hold the movable rail 104 in position. When the axle coupling part 214 rotates in the direction R2, the configuration of the teeth 266 and 268 is so that the axle coupling part 214 can push the clutching part 244 to move away from the engaged position to the disengaged position.

Referring to FIGS. 3-6, the clutching part 246 is coupled to the spool 236 of the lift actuating module 220, and is movable between the disengaged position and the engaged position in sliding contact with the spool 236. According to an example of construction, the clutching part 246 can be disposed around the shaft portion 228 and at least partially received in a hollow interior of the spool 236. The clutching part 246 can be coupled to the spool 236 via a sliding connection configured so that a rotation of the spool 236 in the unwinding direction (i.e., for unwinding the operating part 238) causes the clutching part 246 to slide toward the axle coupling part 214 to the engaged position, and a rotation of the spool 236 in the winding direction (i.e., for winding the operating part 238) causes the clutching part 246 to slide away from the axle coupling part 214 to the disengaged position. The sliding connection between the spool 236 and the clutching part 246 can be carried out via at least one ramp surface provided on the clutching part 246 or the spool 236.

Figure 7:
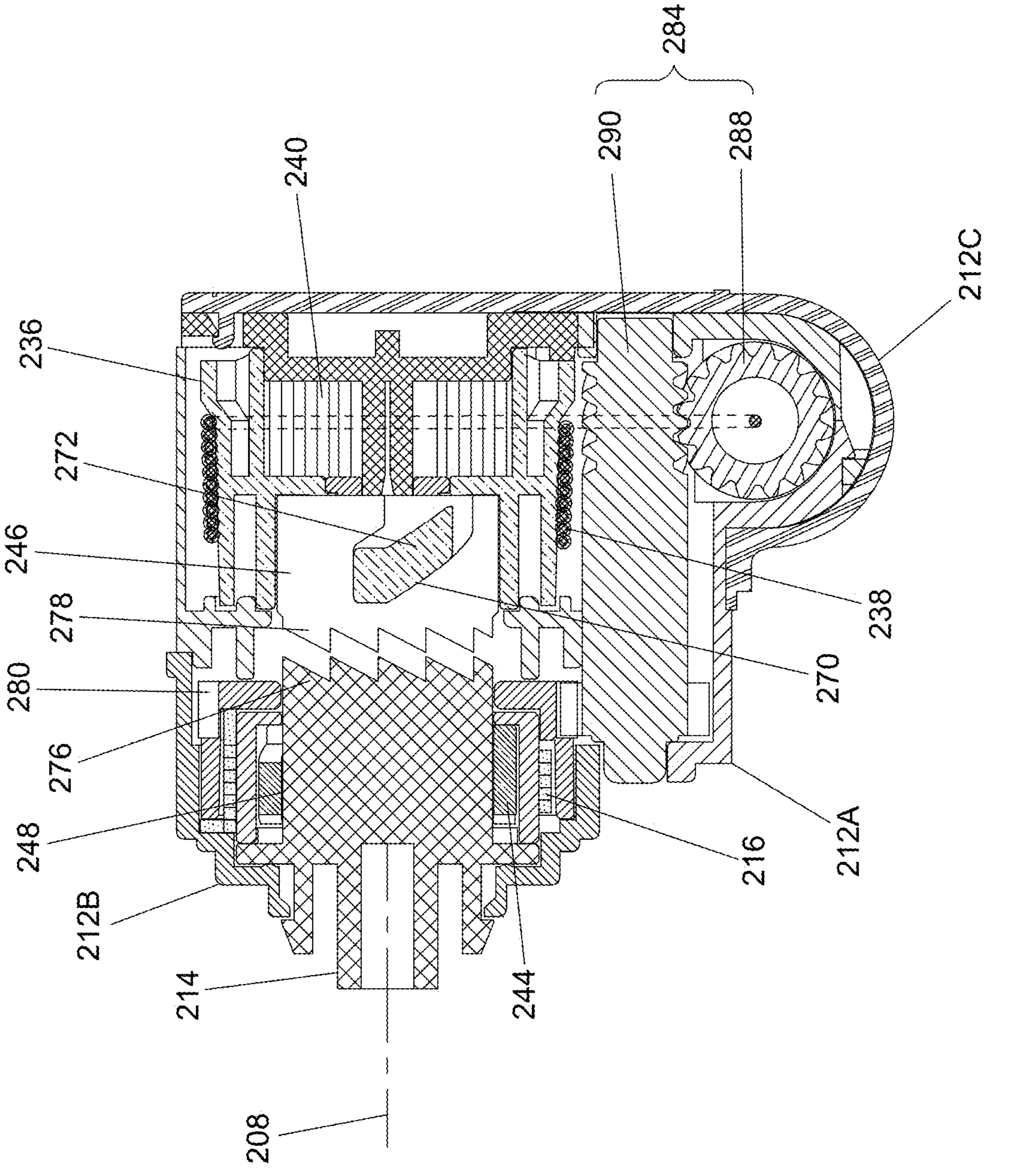
FIGS. 7 and 8 are partial cross-sectional views illustrating an example of a sliding connection between a clutching part of the clutching mechanism and a spool of a lift actuating module.
Figure 8:
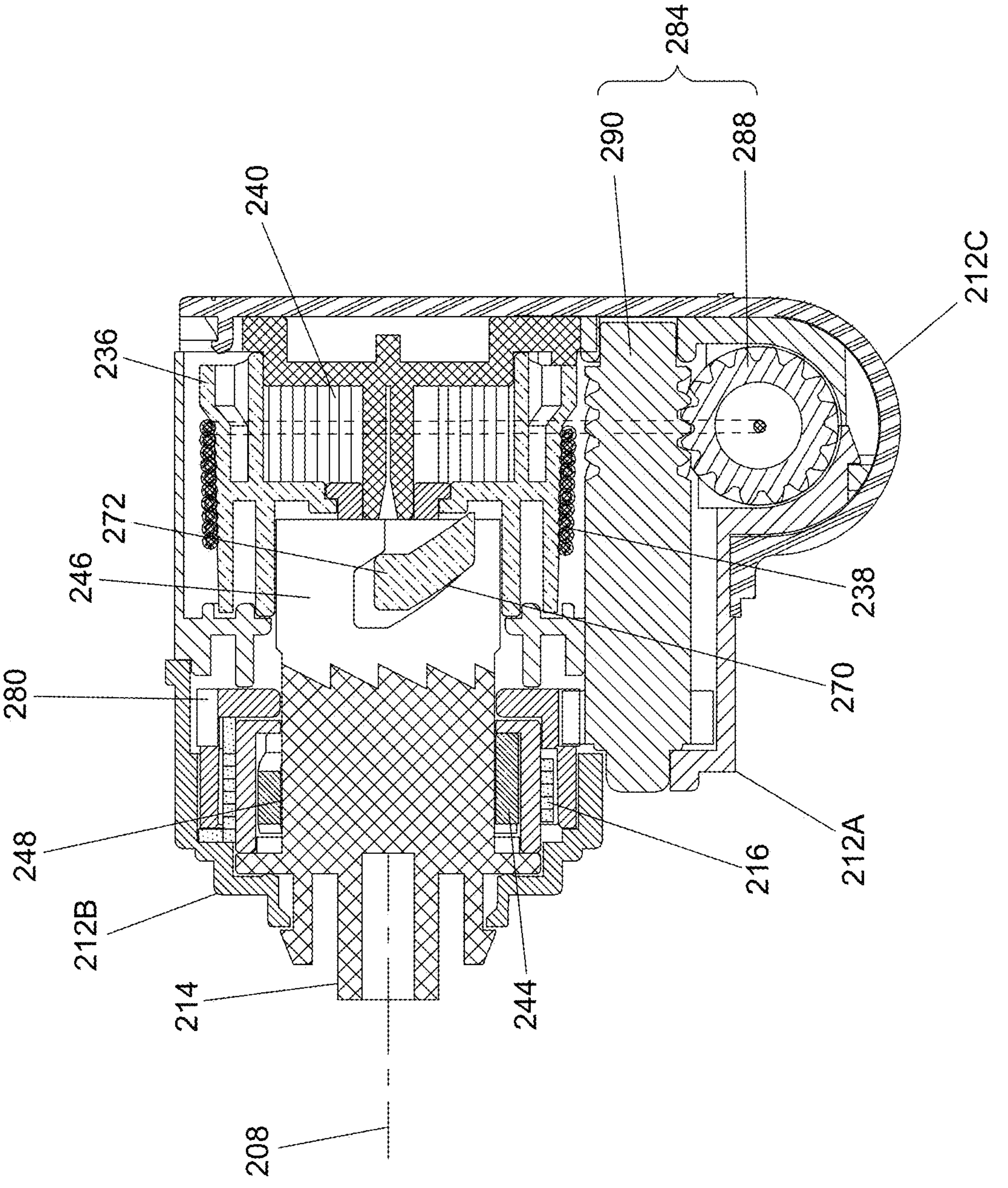

FIGS. 7 and 8 are partial cross-sectional views illustrating an example of a sliding connection between the spool 236 and the clutching part 246. Referring to FIGS. 3-7, the clutching part 246 can have a ramp surface 270 radially distant from the longitudinal axis 208, and the spool 236 can have a protrusion 272 in sliding contact with the ramp surface 270. The ramp surface 270 may be exemplary defined on an edge of a slot 270A provided on a circumferential surface of the clutching part 246, and the protrusion 272 may be provided on an inner wall of the spool 236. It will be appreciated the sliding connection may also be achieved by providing the ramp surface 270 on the spool 236 and the protrusion 272 on the clutching part 246. Through the sliding connection, the clutching part 246 can concurrently rotate about and slide along the longitudinal axis 208 for switching between the disengaged position and the engaged position in response to a rotation of the spool 236. The clutching part 246 is shown in the disengaged position in FIG. 7 and in the engaged position in FIG. 8.

As shown in FIGS. 3 and 4, the clutching part 246 may connect with a torsion spring 274 that is disposed tightly around the shaft portion 228. The torsion spring 274 can provide some resistance for assisting in keeping the clutching part 246 in the disengaged position.

Referring to FIGS. 3-7, the axle coupling part 214 can include a plurality of teeth 276 disposed around the longitudinal axis 208 axially spaced apart from the teeth 266, and the clutching part 246 can include a plurality of teeth 278 disposed around the longitudinal axis 208. The teeth 278 can be engaged with the teeth 276 when the clutching part 246 is in the engaged position, and disengaged from the teeth 276 when the clutching part 246 is in the disengaged position. The teeth 276 may be disposed along a second circumference of the axle coupling part 214 at another end of its intermediate portion 248 that is smaller than the first circumference along which are disposed the teeth 266. The teeth 276 and 278 may have a saw-tooth pattern. When the clutching part 246 is in the engaged position, the engagement between the teeth 276 and 278 allows torque transmission from the spool 236 and the clutching part 246 to the axle coupling part 214 in only the direction R2 and allows rotation of the spool 236 and the clutching part 246 relative to the axle coupling part 214 in the direction R1.

Exemplary operation of the clutching mechanism 222 is described hereinafter with reference to FIGS. 3-8. Supposing that the clutching part 244 is in the engaged position and the clutching part 246 in the disengaged position, which corresponds to a state of the clutching mechanism 222 in which the axle coupling part 214 is coupled to the brake coupling part 218 and decoupled from the spool 236. By pulling the operating part 238, the spool 236 can be rotated in the unwinding direction corresponding to the direction R2, which causes the clutching part 246 to slide in a direction D1 from the disengaged position to the engaged position so that the axle coupling part 214 is rotationally coupled to the spool 236 via the clutching part 246 for rotation in the direction R2. Owing to the configuration of the teeth 266 and 268, the coupled rotation of the spool 236 and the axle coupling part 214 in the direction R2 then can urge the clutching part 244 to slide in a direction D2 opposite to the direction D1 from the engaged position to the disengaged position, whereby the axle coupling part 214 can be decoupled from the brake coupling part 218. Accordingly, the clutching mechanism 222 can be switched to a state in which the axle coupling part 214 is decoupled from the brake coupling part 218 and coupled to the spool 236 for rotation in the direction R2. In this state, the braking force of the braking part 216 no longer applies on the axle coupling part 214, while the brake coupling part 218 and the clutching part 244 remain generally stationary, the spool 236, the clutching part 246 and the axle coupling part 214 can rotate concurrently for raising the movable rail 104.

When the operating part 238 is released after it has been extended from the spool 236, the spring 240 can bias the spool 236 to rotate in the winding direction corresponding to the direction R1 for retracting the operating part 238. The rotation of the spool 236 in the direction R1 causes the clutching part 246 to slide in the direction D2 from the engaged position to the disengaged position so that the axle coupling part 214 is rotationally decoupled from the spool 236. The suspended load of the movable rail 104 then may cause the axle coupling part 214 to rotate in the direction R1. Owing to the sliding contact between the ramp surface 258 of the clutching part 244 and the ramp surface 262 of the brake coupling part 218 and a frictional contact between the axle coupling part 214 and the clutching part 244, the rotational displacement of the axle coupling part 214 in the direction R1 causes the clutching part 244 to rotate and slide in the direction D1 from the disengaged position to the engaged position so that the axle coupling part 214 is coupled to the brake coupling part 218 via the clutching part 244. As a result, the clutching mechanism 222 can be switched to a state in which the axle coupling part 214 is coupled to the brake coupling part 218 and decoupled from the spool 236. In this state, the braking force of the braking part 216 can apply on the axle coupling part 214 to prevent its rotation in the direction R1, whereby the movable rail 104 can be held in position relative to the head rail 102 while the spool 236 rotates in the direction R1 for winding the operating part 238.

In the clutching mechanism 222 described herein, the clutching part 244 thus can slide in the direction D1 and the clutching part 246 in the opposite direction D2 to rotationally couple the axle coupling part 214 to the brake coupling part 218 and at the same time rotationally decouple the axle coupling part 214 with respect to the spool 236. Conversely, the clutching part 244 can slide in the direction D2 and the clutching part 246 in the opposite direction D1 to rotationally couple the axle coupling part 214 to the spool 236 and at the same time rotationally decouple the axle coupling part 214 with respect to the brake coupling part 218. Since the axle coupling part 214 is coupled to only one of the brake coupling part 218 and the spool 236 at a time, undesirable friction between the axle coupling part 214 and the brake coupling part 218 can be prevented when the axle coupling part 214 rotates along with the spool 236.

Referring to FIGS. 1-5 and 9, the control module 206 can further include a brake release part 280 connected with the braking part 216, and a control wand 282 connected with the brake release part 280 via a transmission assembly 284. The braking part 216 can be mounted in frictional contact with the outer surface 234 of the brake coupling part 218 as described previously, and can have two ends 216A and 216B respectively anchored to the housing 210 and the brake release part 280. The brake release part 280 is configured to be movable for causing the braking part 216 to loosen its frictional contact with the brake coupling part 218. According to an example of construction, the brake release part 280 can be disposed for rotation about the longitudinal axis 208. For example, the brake release part 280 can have a ring shape pivotally disposed around the intermediate portion 248 of the axle coupling part 214. The brake release part 280 is thereby rotatable relative to the axle coupling part 214 to displace the end 216B of the braking part 216 in a direction that urges the braking part 216 to enlarge and loosen its frictional contact with the brake coupling part 218.

The control wand 282 is operable to urge the brake release part 280 to move for causing the braking part 216 to loosen the frictional contact with the brake coupling part 218. The control wand 282 may have any suitable shape for facilitating manual operation. For example, the control wand 282 may have an elongate shape that extends along a lengthwise axis Y and is exposed for operation. The operating part 238 may be threaded through a hollow interior of the control wand 282, and may have an end anchored to a handle 286. The handle 286 is disposed adjacent to a distal end of the control wand 282, and can be pulled away from the control wand 282 for extending the operating part 238 from the spool 236. A guide element 287 may be provided inside the housing 210 for guiding the operating part 238.

The transmission assembly 284 is configured so that a predetermined actuating movement of the control wand 282 can be transmitted through the transmission assembly 284 to urge the brake release part 280 to move for causing the braking part 216 to loosen the frictional contact with the brake coupling part 218. In conjunction with FIGS. 3-5, FIG. 9 is a schematic view illustrating some construction details of the transmission assembly 284. Referring to FIGS. 3-5 and 9, the transmission assembly 284 can have a construction that is adapted to the actuating movement of the control wand 282. According to an example of construction, the control wand 282 is rotatable about the lengthwise axis Y thereof for causing the braking part 216 to loosen the frictional contact with the brake coupling part 218, and the transmission assembly 284 may include two transmission elements 288 and 290. The transmission elements 288 and 290 can include gear elements. The transmission element 288 has a gear portion 288A and is pivotally connected with the control wand 282. The transmission element 290 has two gear portions 290A and 290B and is pivotally assembled inside the housing 210. The gear portion 288A of the transmission element 288 is meshed with the gear portion 290A of the transmission element 290, and the gear portion 290B of the transmission element 290 is meshed with a gear portion 280A provided on the brake release part 280. The two transmission elements 288 and 290 may be disposed so as to respectively rotate about two axes that are perpendicular to each other, the axis of rotation of the transmission element 290 being parallel to the longitudinal axis 208, and the axis of rotation of the transmission element 288 being tilted an angle relative to a vertical direction. With this arrangement, a rotational displacement of the control wand 282 about the lengthwise axis Y can be transmitted through the transmission assembly 284 to the brake release part 280, which causes the brake release part 280 to rotate and urge the braking part 216 to loosen the frictional contact with the brake coupling part 218. When the control wand 282 is released, the braking part 216 can recover the tightening state with respect to the brake coupling part 218.

Figure 9:
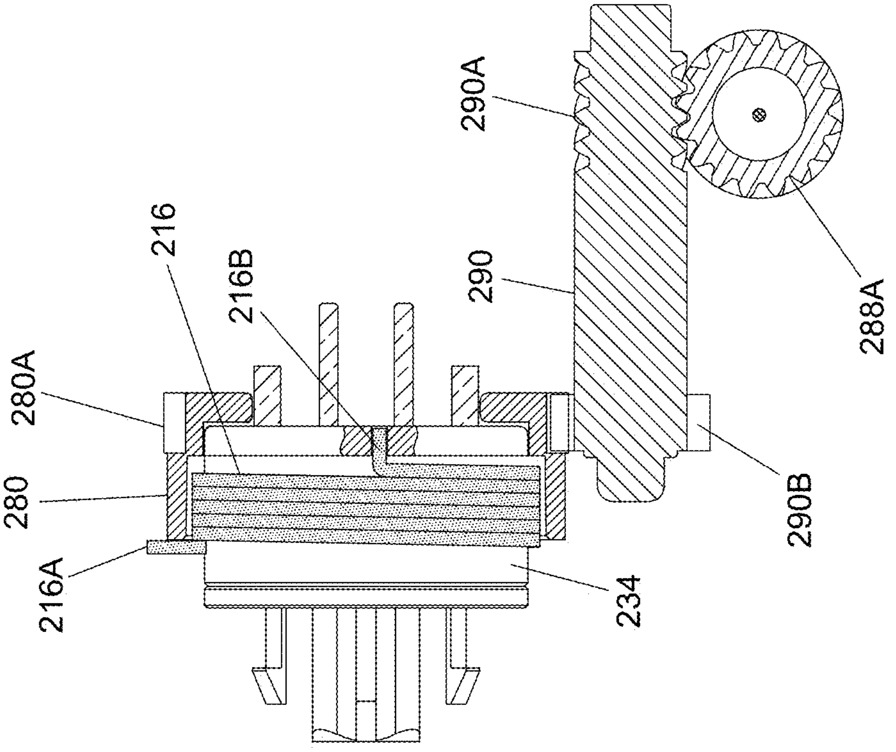
FIG. 9 is a schematic view illustrating some construction details of a transmission assembly that connects a control wand with a brake release part in the control module of FIG. 3.
Figure 10:
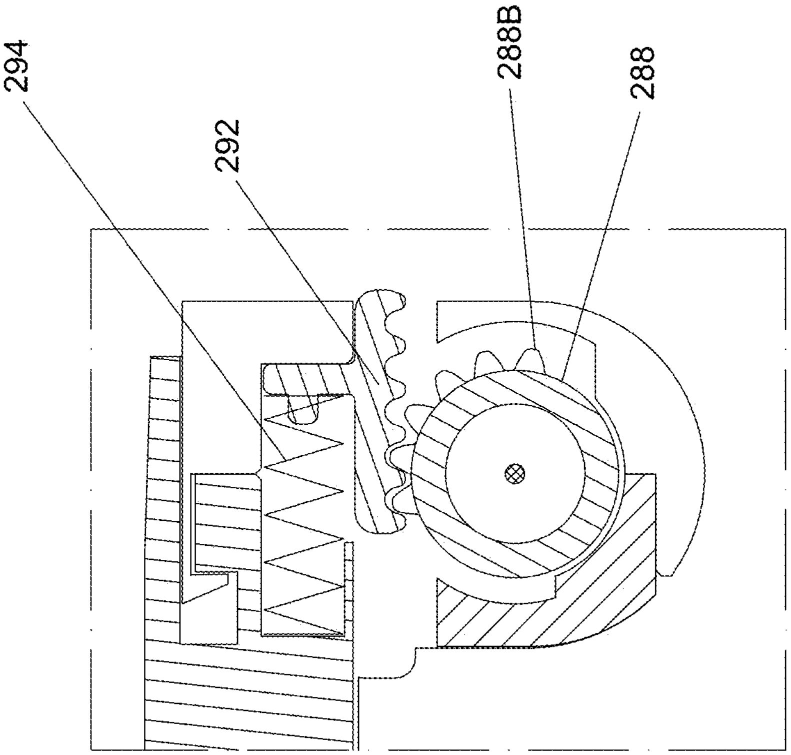
FIG. 10 is a schematic view illustrating a biasing mechanism configured to assist the control wand in recovering an initial position corresponding to a tightening state of a braking part with respect to a brake coupling part in the control module of FIG. 3.
Figure 11:
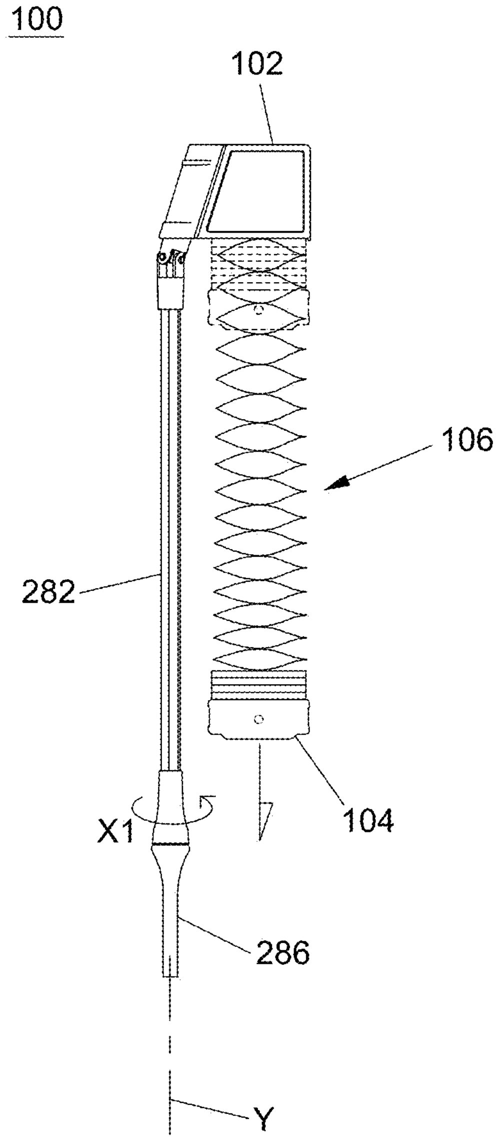
FIGS. 11 and 12 are schematic views illustrating exemplary operation for expanding the window shade of FIG. 1.
Figure 12:
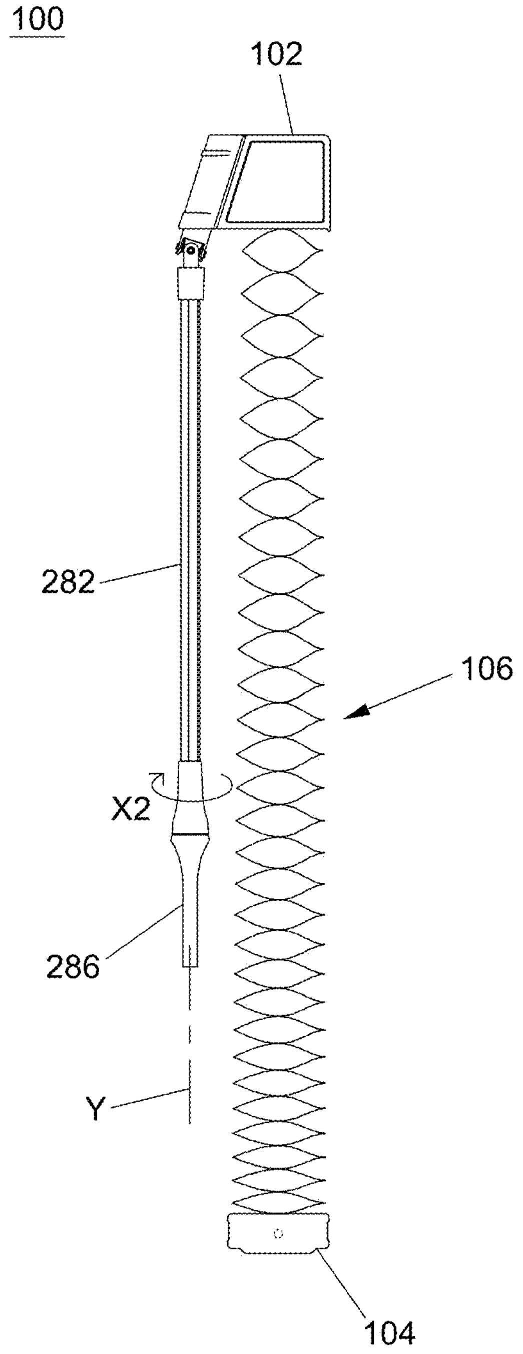
Figure 13:
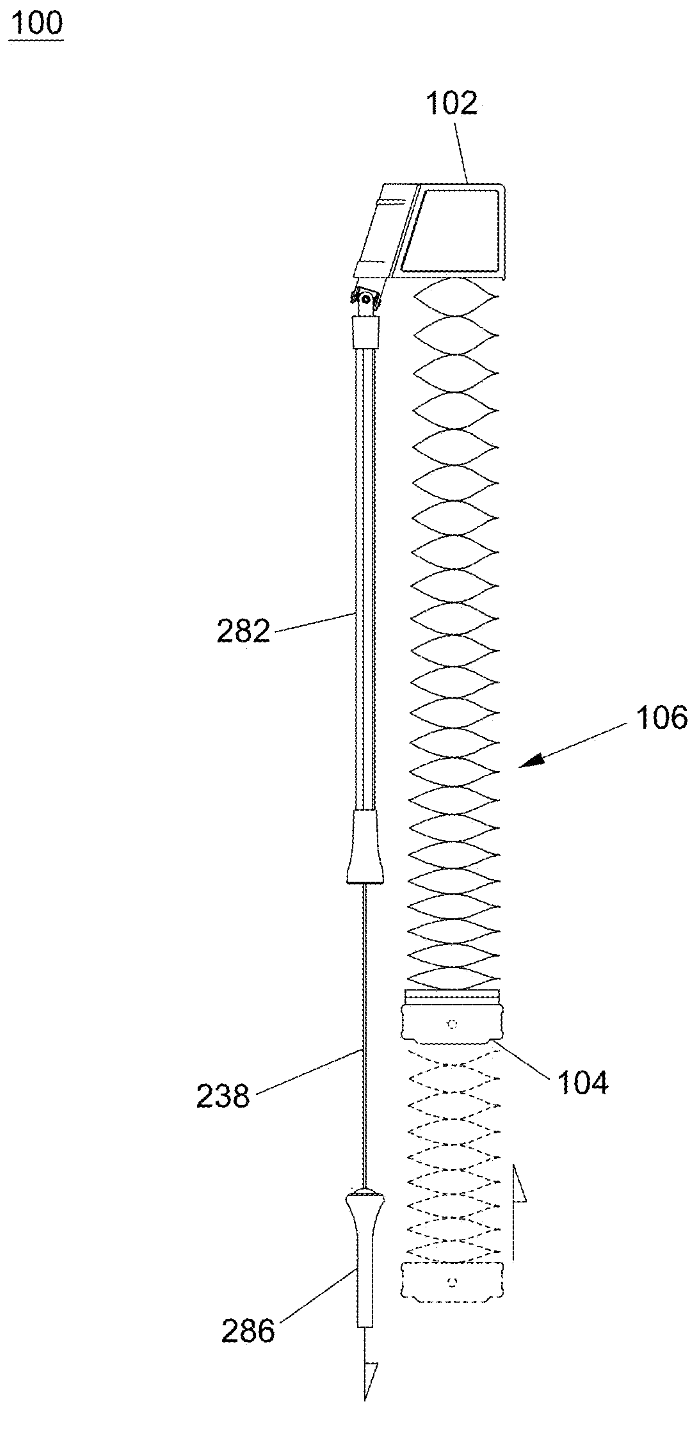
FIGS. 13 and 14 are schematic views illustrating exemplary operation for raising the movable rail of the window shade of FIG. 1.
Figure 14:
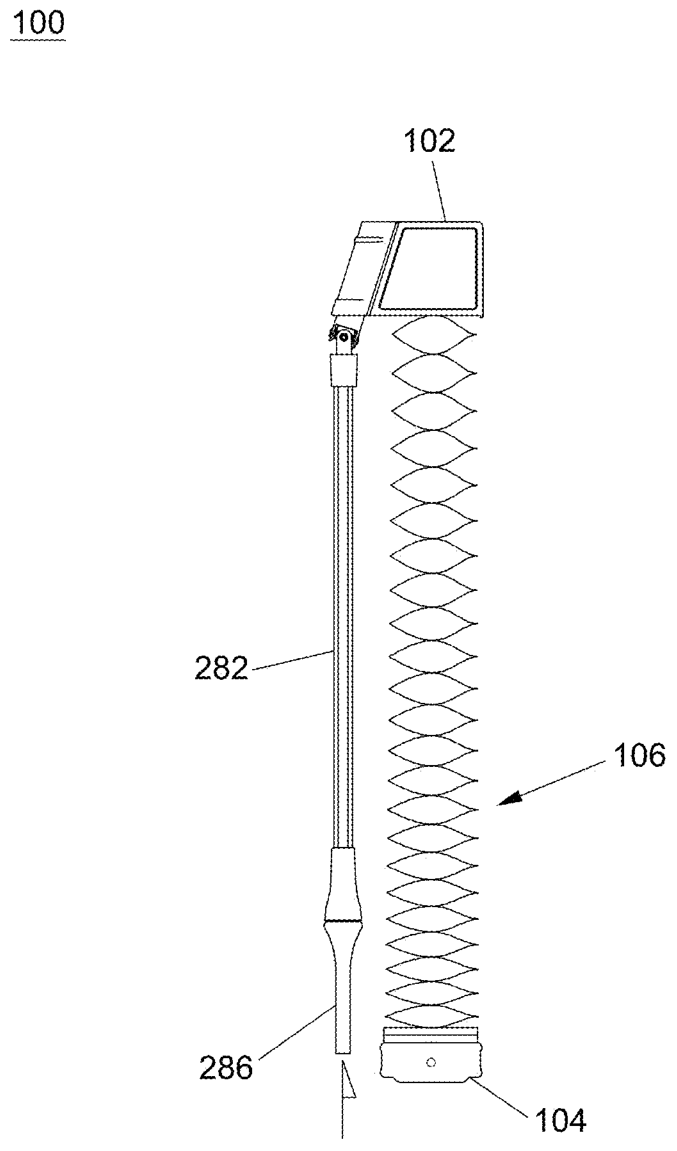

Referring to FIGS. 3, 9 and 10, the control module 206 may include a biasing mechanism configured to assist the control wand 282 in recovering an initial position corresponding to the tightening state of the braking part 216 with respect to the brake coupling part 218. For example, one of the transmission elements 288 and 290 may be coupled to a biasing spring that exerts a spring force for assisting the control wand 282 to recover its initial position when the control wand 282 is not operated by a user. According to an example of construction, the transmission element 288 may have a toothed portion 288B meshed with a rack element 292, and the rack element 292 can be connected with a biasing spring 294. When no external force is applied on the control wand 282, the biasing spring 294 can urge the rack element 292 to slide and cause the transmission element 288 to rotate, which in turn can cause the control wand 282 to recover its initial position and the braking part 216 to recover the tightening state.

In conjunction with FIGS. 1-10, FIGS. 11 and 12 are schematic views illustrating exemplary operation for expanding the window shade 100 provided with the actuating system 200 described previously. Referring to FIGS. 1-10, supposing that the movable rail 104 is initially held in position relative to the head rail 102. In this initial state, the axle coupling part 214 is decoupled from the spool 236 and coupled to the brake coupling part 218 via the clutching part 244. Accordingly, the tightening action exerted by the braking part 216 on the brake coupling part 218 can prevent rotation of the axle coupling part 214 in a direction that would lower the movable rail 104.

Referring to FIGS. 3-8 and 11, a user can rotate the control wand 282 about its lengthwise axis Y in one direction X1 for expanding the window shade 100. As described previously, this rotational displacement of the control wand 282 can urge the brake release part 280 to move for causing the braking part 216 to loosen the frictional contact with the brake coupling part 218. As a result, the axle coupling part 214, the brake coupling part 218, and the clutching part 244 in the engaged position can rotate concurrently for lowering the movable rail 104 by gravity action. The spool 236 and the clutching part 246 can remain generally stationary while the axle coupling part 214 rotates for lowering the movable rail 104.

Referring to FIGS. 3-8 and 12, when the movable rail 104 moving downward reaches a desired position, the user can release the control wand 282, which can reversely rotate about its lengthwise axis Y in a direction X2 to recover its initial position owing to the action of the biasing spring 294. As a result, the braking part 216 can recover the tightening state, and the movable rail 104 can be held in the desired position relative to the head rail 102.

In conjunction with FIGS. 1-10, FIGS. 13 and 14 are schematic views illustrating exemplary operation for raising the movable rail 104 of the window shade 100 provided with the actuating system 200 described previously. Referring to FIGS. 3-8 and 13, when a user wants to raise the movable rail 104, the operating part 238 can be pulled downward with the handle 286, which causes the spool 236 to rotate in the unwinding direction. As a result, the clutching mechanism 222 is switched to the state in which the axle coupling part 214 is decoupled from the brake coupling part 218 and coupled to the spool 236 via the clutching part 246 like previously described. Accordingly, the axle coupling part 214 and the spool 236 can rotate concurrently for raising the movable rail 104.

Referring to FIGS. 3-8 and 14, the user can release the handle 286 when the movable rail 104 has reached a desired position or when the operating part 238 has extended a maximum length. As a result, the spool 236 rotates for winding the operating part 238 owing to the action of the spring 240, and the clutching mechanism 222 is switched to the state in which the axle coupling part 214 is decoupled from the spool 236 and coupled to the brake coupling part 218 via the clutching part 244 like previously described. Accordingly, the tightening action exerted by the braking part 216 on the brake coupling part 218 can prevent rotation of the axle coupling part 214 so that the movable rail 104 is held in position while the spool 236 rotates in the winding direction.

The aforementioned actuation and release of the operating part 238 can be repeated multiple times until the movable rail 104 rises to a desired position.

Figure 15:
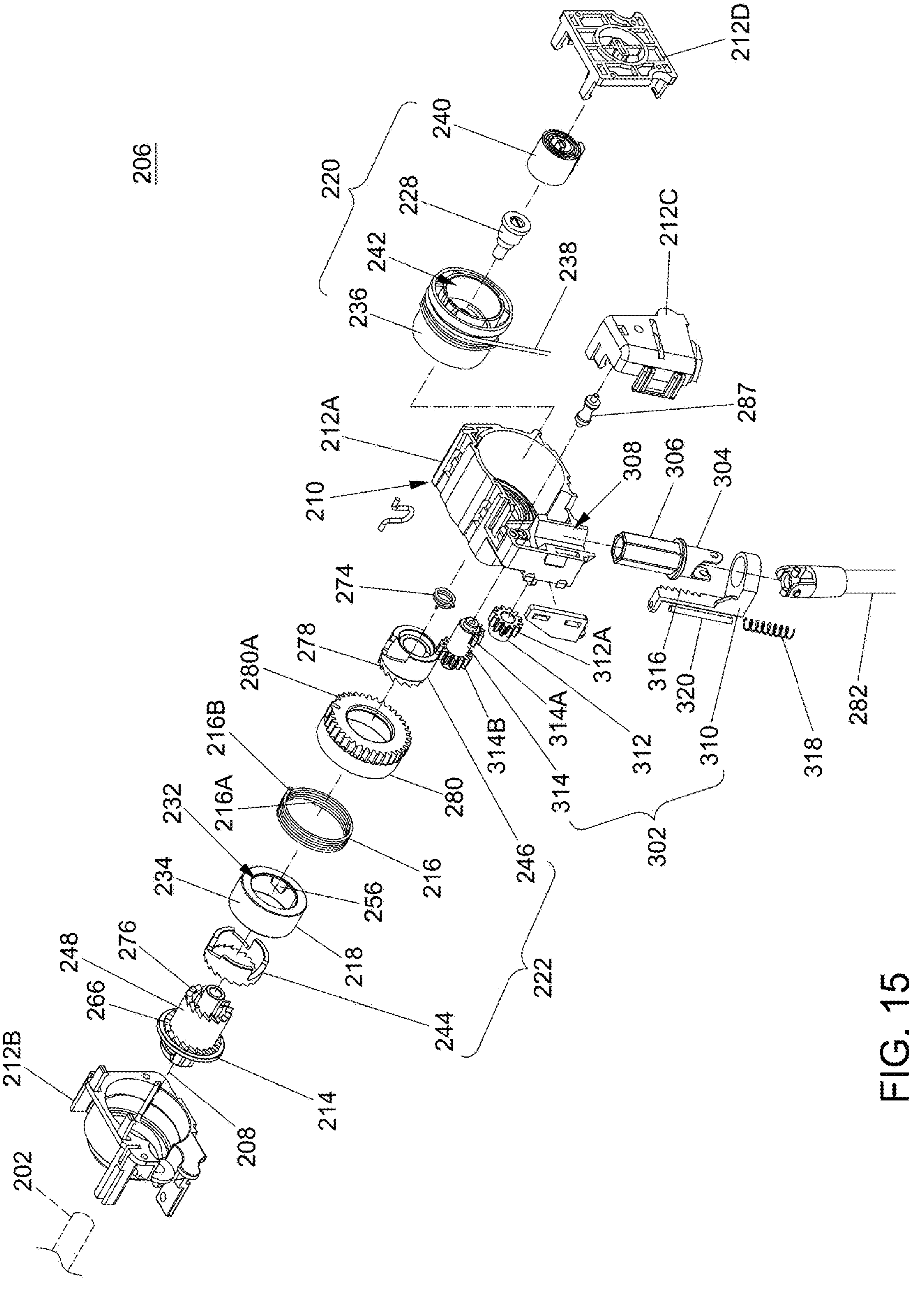
FIG. 15 is an exploded view illustrating a variant construction of a control module provided in an actuating system for a window shade.
Figure 16:
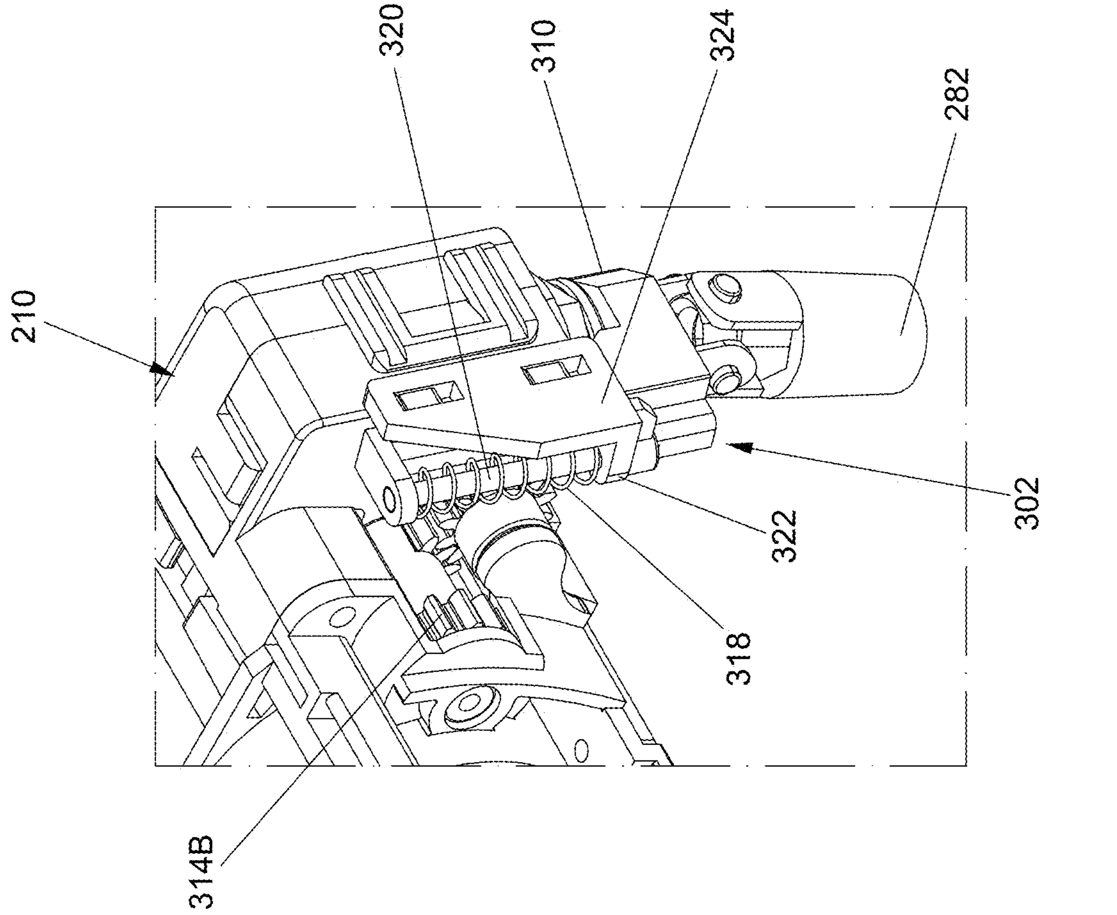
FIG. 16 is an enlarged view illustrating some construction details of a transmission assembly provided in the control module shown in FIG. 15.
Figure 17:
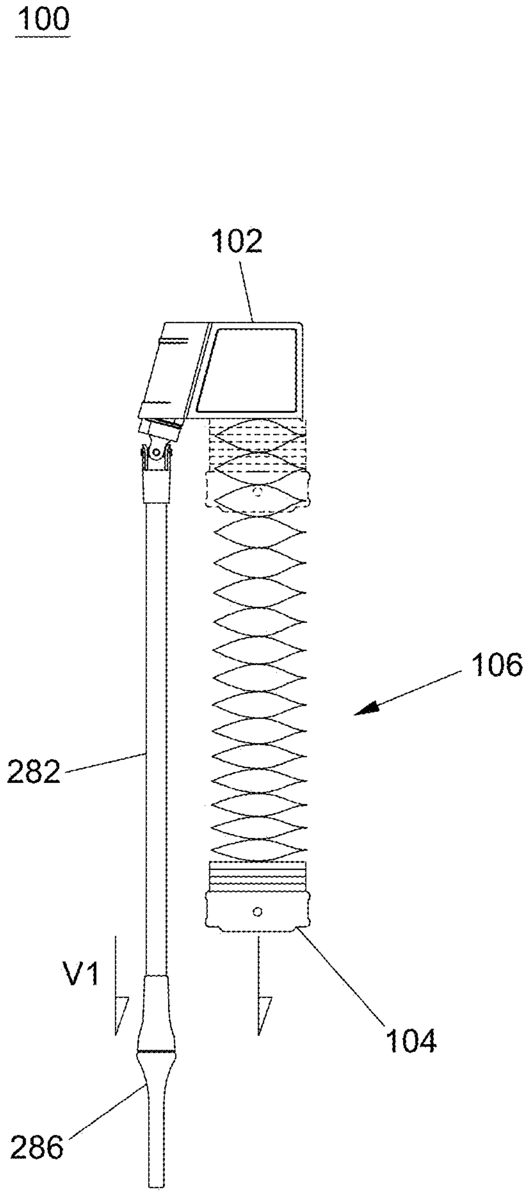
FIGS. 17 and 18 are schematic views illustrating exemplary operation for expanding a window shade provided with the control module shown in FIG. 15.
Figure 18:
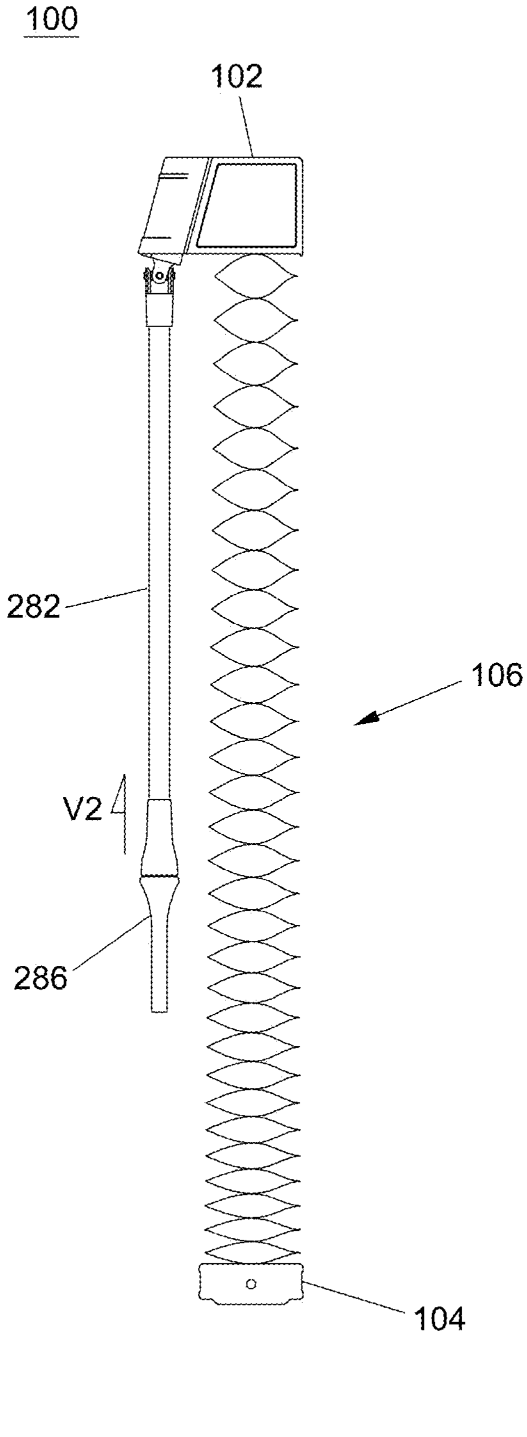

FIG. 15 is an exploded view illustrating a variant construction of the control module 206 in which the transmission assembly 284 previously described is replaced with a transmission assembly 302, and FIG. 16 is an enlarged view illustrating some construction details of the transmission assembly 302. Referring to FIGS. 15 and 16, the transmission assembly 302 is adapted to operate with a sliding movement of the control wand 282 for urging the brake release part 280 to move for causing the braking part 216 to loosen the frictional contact with the brake coupling part 218. Rather than rotating the control wand 282 about its lengthwise axis Y, the control wand 282 thus can be pulled downward for lowering the movable rail 104.

Referring to FIGS. 15 and 16, the control wand 282 can be slidably connected with the housing 210 via a slider 304. For example, the slider 304 can be pivotally connected with an upper end of the control wand 282, and can have a rod portion 306 slidably received in a channel 308 provided inside the housing 210. The pivotal connection between the control wand 282 and the slider 304 allows tilting of the control wand 282 relative to the slider 304 for facilitating operation of the control wand 282. The control wand 282 and the slider 304 can slide in unison upward and downward relative to the housing 210.

The transmission assembly 302 can include three transmission elements 310, 312 and 314. The transmission element 310 is movable upward and downward along with the control wand 282, and can have a toothed portion 316. According to an example of construction, the transmission element 310 can be connected with the slider 304, and can slide upward and downward along with the control wand 282 and the slider 304. The toothed portion 316 of the transmission element 310 may extend generally parallel to an axis of sliding movement of the slider 304.

The transmission elements 312 and 314 may be two gear elements that are pivotally assembled inside the housing 210. The transmission element 312 can have a gear portion 312A, and the transmission element 314 can have two gear portions 314A and 314B spaced apart from each other. The gear portion 312A of the transmission element 312 can be respectively meshed with the toothed portion 316 of the transmission element 310 and the gear portion 314A of the transmission element 314. The gear portion 314B of the transmission element 314 can be meshed with the gear portion 280A of the brake release part 280. With this arrangement, a downward sliding displacement of the control wand 282 can be transmitted through the transmission assembly 302 to the brake release part 280, which causes the brake release part 280 to rotate and urge the braking part 216 to loosen the frictional contact with the brake coupling part 218. When the control wand 282 is released, the braking part 216 can recover the tightening state with respect to the brake coupling part 218.

Referring to FIG. 15, the transmission element 310 can be coupled to a biasing spring 318 that exerts a spring force for assisting the control wand 282 to recover its initial position when the control wand 282 is not operated by a user. According to an example of construction, the transmission element 310 can be fixedly connected with a rod 320, and the biasing spring 318 can be disposed around the rod 320 with two ends of the biasing spring 318 respectively connected with the transmission element 310 and a shoulder portion 322 provided on a sidewall 324 of the housing 210. When no external force is applied on the control wand 282, the biasing spring 318 can urge the transmission element 310 and the slider 304 to slide upward, which in turn can cause the control wand 282 to slide upward to recover its initial position and the braking part 216 to recover the tightening state.

Aside the transmission assembly 302, the remaining components of the control module 206 shown in FIG. 15 can be similar to the previous embodiment shown in FIG. 3.

In conjunction with FIGS. 15 and 16, FIGS. 17 and 18 are schematic views illustrating exemplary operation for expanding the window shade 100 provided with the control module 206 shown in FIG. 15. Referring to FIGS. 15-18, a user can pull the control wand 282 downward in a direction V1 for expanding the window shade 100. As described previously, this downward sliding displacement of the control wand 282 can urge the brake release part 280 to move for causing the braking part 216 to loosen the frictional contact with the brake coupling part 218. As a result, the axle coupling part 214, the brake coupling part 218, and the clutching part 244 coupled thereto can rotate concurrently for lowering the movable rail 104 by gravity action. The spool 236 and the clutching part 246 can remain generally stationary while the axle coupling part 214 rotates for lowering the movable rail 104. When the movable rail 104 moving downward reaches a desired position, the user can release the control wand 282, which can slide upward in a direction V2 to recover its initial position owing to the action of the biasing spring 318. As a result, the braking part 216 can recover the tightening state, and the movable rail 104 can be held in the desired position relative to the head rail 102. For retracting the window shade 100 shown in FIGS. 17 and 18, the movable rail 104 can be raised by pulling and releasing the handle 286 like previously described.

Figure 19:
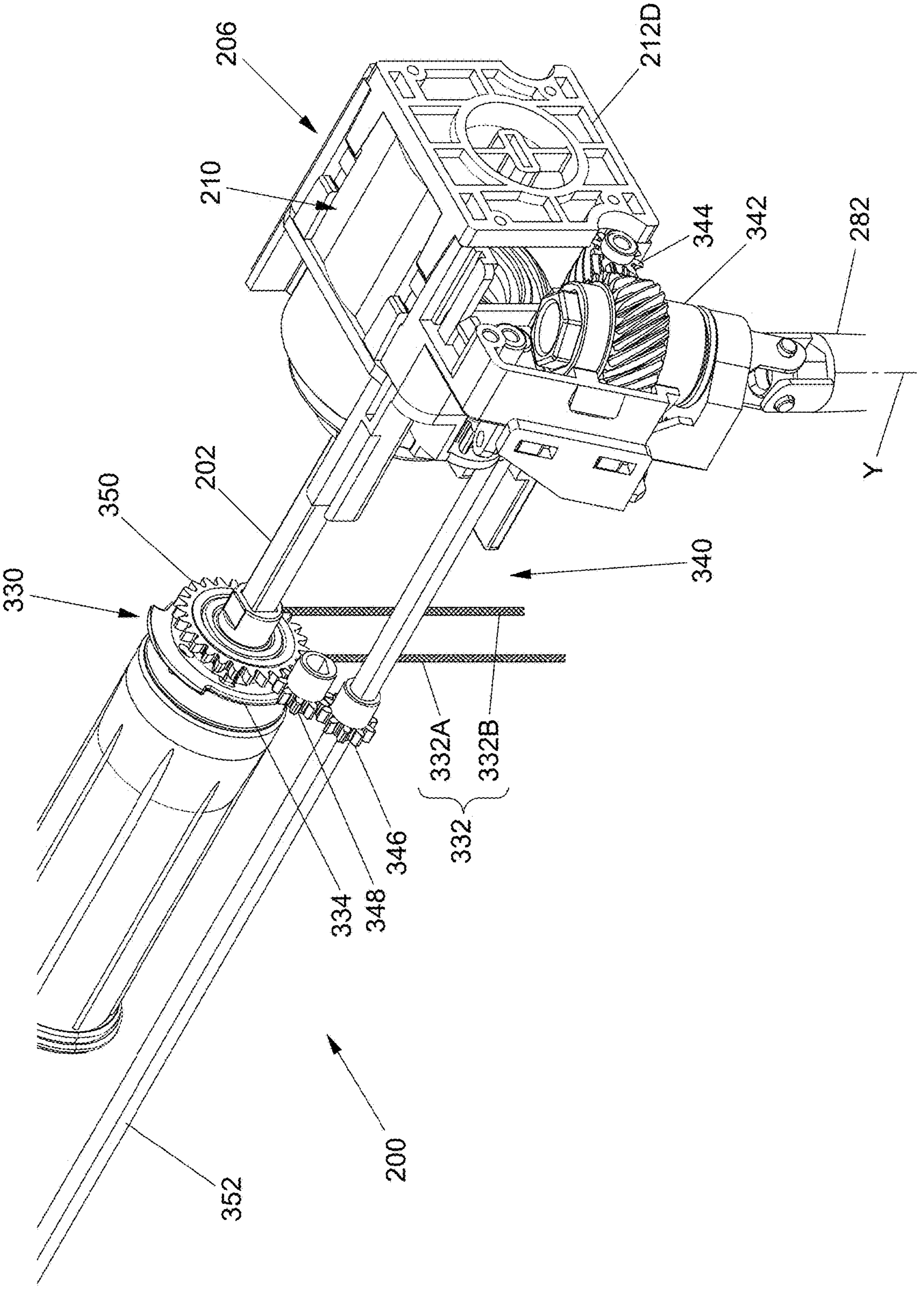
FIG. 19 is a perspective view illustrating another variant construction of the actuating system including a shade tilting mechanism.
Figure 20:
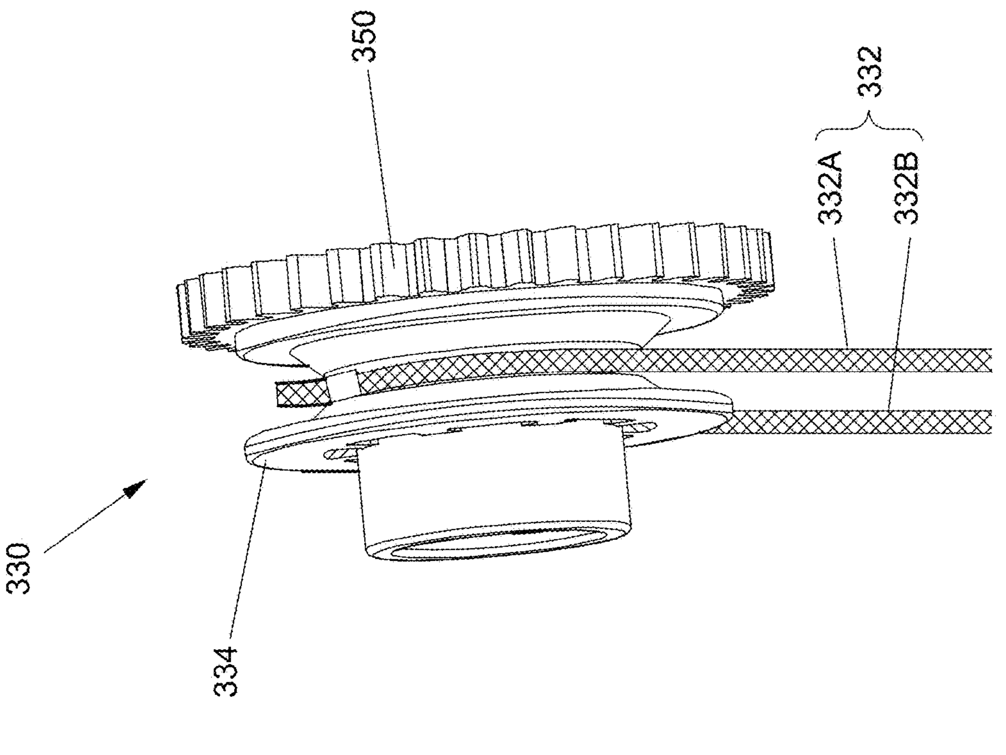
FIG. 20 is a perspective view illustrating a portion of the shade tilting mechanism.
Figure 21:
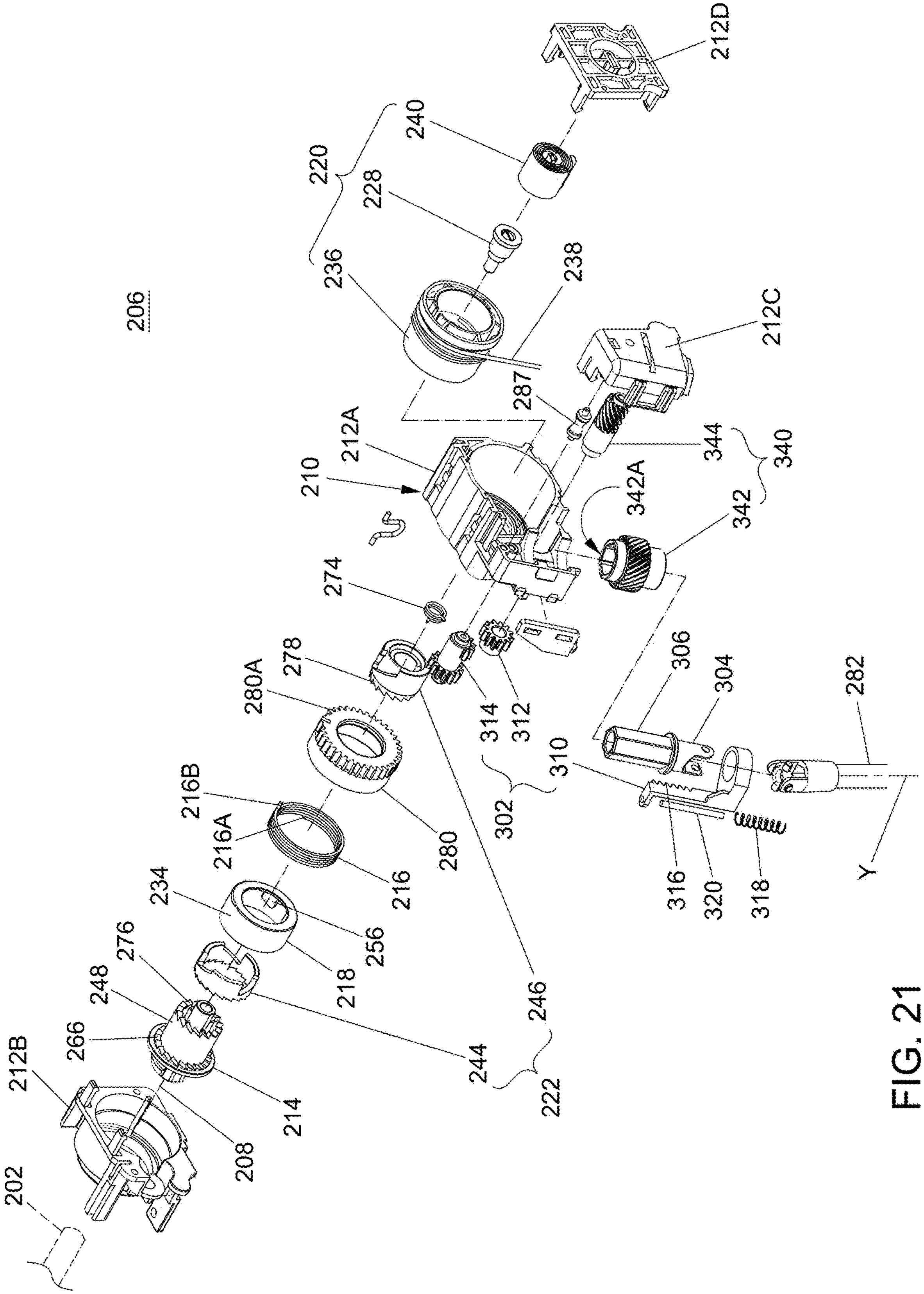
FIG. 21 is an exploded view illustrating construction details of the control module provided in the actuating system shown in FIG. 19.

In conjunction with FIG. 15, FIG. 19 is a perspective view illustrating another variant construction of the actuating system 200 that further includes a shade tilting mechanism 330, FIG. 20 is a perspective view illustrating a portion of the shade tilting mechanism 330, and FIG. 21 is an exploded view illustrating construction details of the control module 206 provided in the actuating system 200 shown in FIG. 19. Referring to FIGS. 19-21, the shade tilting mechanism 330 is operable to adjust an angular position of a shading structure of a window shade, and can include a ladder assembly 332 and a rotary wheel 334 connected with each other. The ladder assembly 332 can loop about the rotary wheel 334, and can include two strip portions 332A and 332B that extend downward from the rotary wheel 334 and are respectively connected with the shading structure of the window shade. The two strip portions 332A and 332B can include, without limitation, cord, tapes, and the like. The rotary wheel 334 can rotate to vertically displace the two strip portions 332A and 332B in opposite directions. According to an example of construction, the rotary wheel 334 can be pivotally supported about the transmission axle 202. The rotary wheel 334 can be mounted so as to be rotatable relative to the transmission axle 202 for vertically displacing the two strip portions 332A and 332B in opposite directions.

Referring to FIGS. 19-21, the control wand 282 can be connected with the brake release part 280 via the transmission assembly 302 like described previously, and can be connected with the shade tilting mechanism 330 via another transmission assembly 340. The transmission assembly 340 can include a plurality of gear elements 342, 344, 346, 348 and 350, and a transmission axle 352. The transmission axle 352 can extend parallel to the transmission axle 202, and can be pivotally connected with the housing 210. The two gear elements 344 and 346 can be rotationally coupled to the transmission axle 352 at two axially spaced apart locations so that the transmission axle 352 and the gear elements 344 and 346 can rotate in unison. The gear element 342 is pivotally disposed inside the housing 210, is rotationally coupled to the control wand 282, and is meshed with the gear element 344. According to an example of construction, the gear element 342 can be rotationally coupled to the control wand 282 via the slider 304. More specifically, the rod portion 306 of the slider 304 can be received through a hole 342A provided in the gear element 342. The shape of the rod portion 306 and the shape of the hole 342A are configured so that the slider 304 is slidable upward and downward along with the control wand 282 relative to the gear element 342 and the housing 210, and the gear element 342 and the slider 304 are rotatable along with the control wand 282 relative to the housing 210 during rotation of the control wand 282 about the lengthwise axis Y. The gear element 350 is rotationally coupled to the rotary wheel 334 so that both the rotary wheel 334 and the gear element 350 are rotatable in unison about a same axis. The gear element 348 is respectively meshed with the gear element 346 and the gear element 350.

With the aforementioned construction, the rotary wheel 334 of the shade tilting mechanism 330 is rotatable about the transmission axle 202 and is connected with the control wand 282 via the transmission assembly 340. A rotation of the control wand 282 about its lengthwise axis Y can urge the transmission axle 352 to rotate through the engagement of the gear elements 342 and 344, which in turn causes the rotary wheel 334 to rotate about the transmission axle 202 through the engagement of the gear elements 346, 348 and 350 for displacing the two strip portions 332A and 332B in opposite directions. Accordingly, the control wand 282 is rotatable about its lengthwise axis Y to actuate the shade tilting mechanism 330, and is slidable vertically to urge the brake release part 280 to move for causing the braking part 216 to loosen the frictional contact with the brake coupling part 218 as described previously.

Based on the aforementioned description, it will be appreciated that multiple shade tilting mechanisms 330 of the same construction may be provided for use in a window shade. Each shade tilting mechanism 330 can likewise have the rotary wheel 334 pivotally supported about the transmission axle 202, and a corresponding set of gears including the gear elements 346, 348 and 350 can be likewise disposed for connecting each shade tiling mechanism 330 with the control wand 282.

Aside the shade tilting mechanism 330 and the transmission assembly 340, the other components of the actuating system 200 shown in FIG. 19 can be similar to the embodiments previously described. In particular, the control module 206 of the actuating system 200 shown in FIG. 19 can be similar to the control module 206 shown in FIG. 15.

Figure 22:
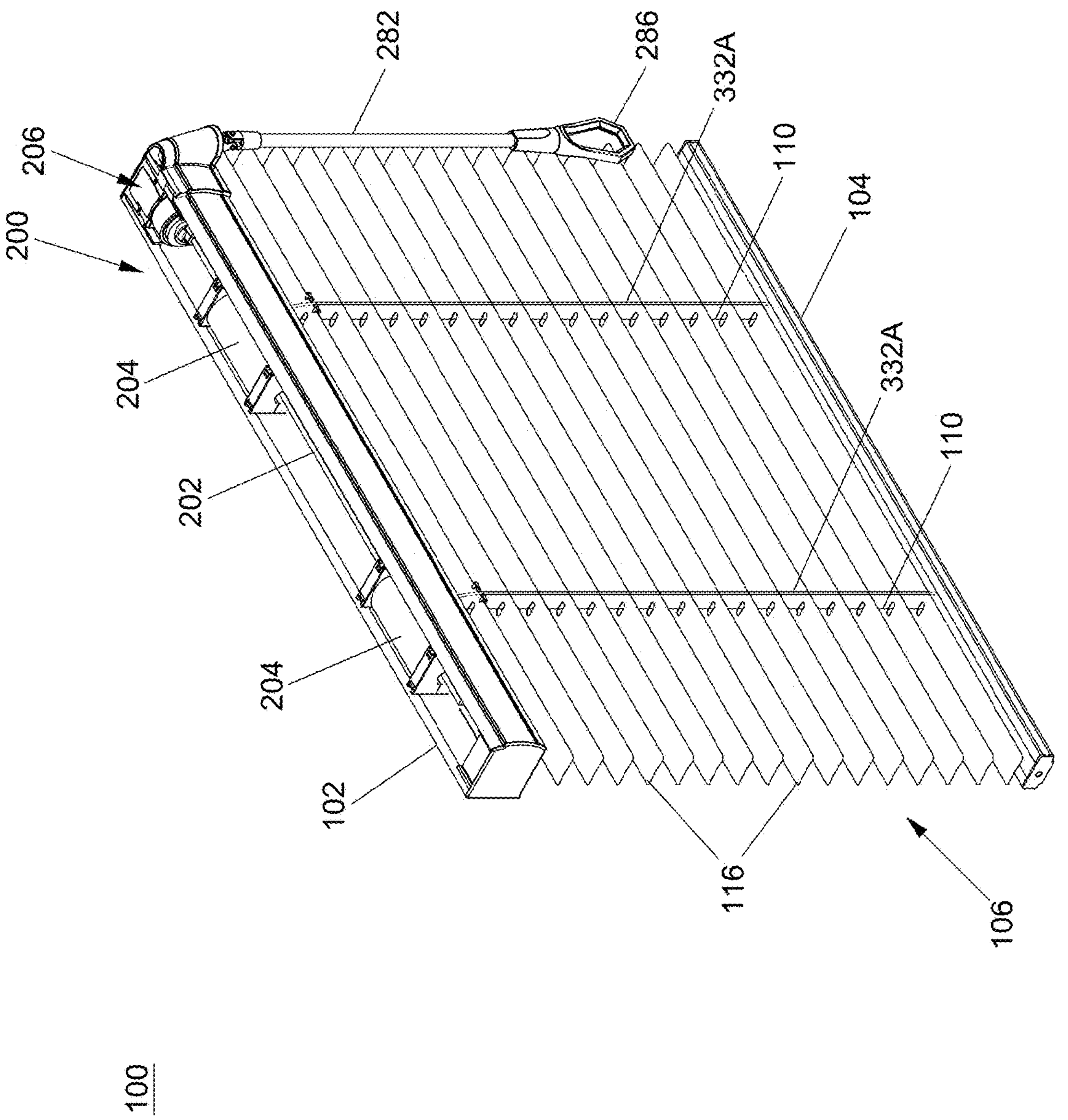
FIG. 22 is a perspective view illustrating an embodiment of a window shade incorporating the actuating system shown in FIG. 19.
Figure 23:
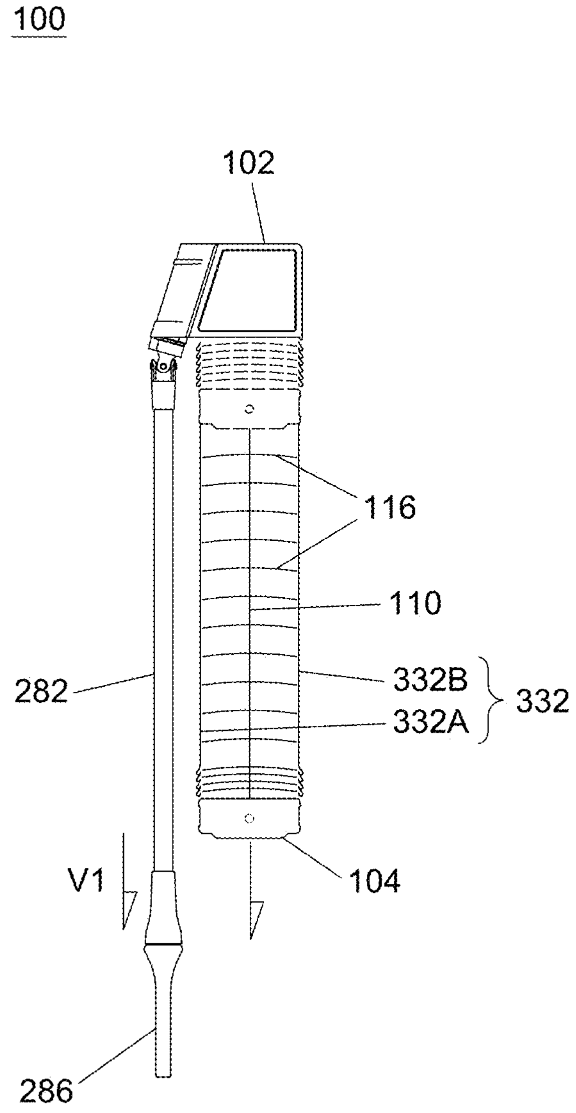
FIGS. 23 and 24 are schematic views illustrating exemplary operation for expanding the window shade shown in FIG. 22.
Figure 24:
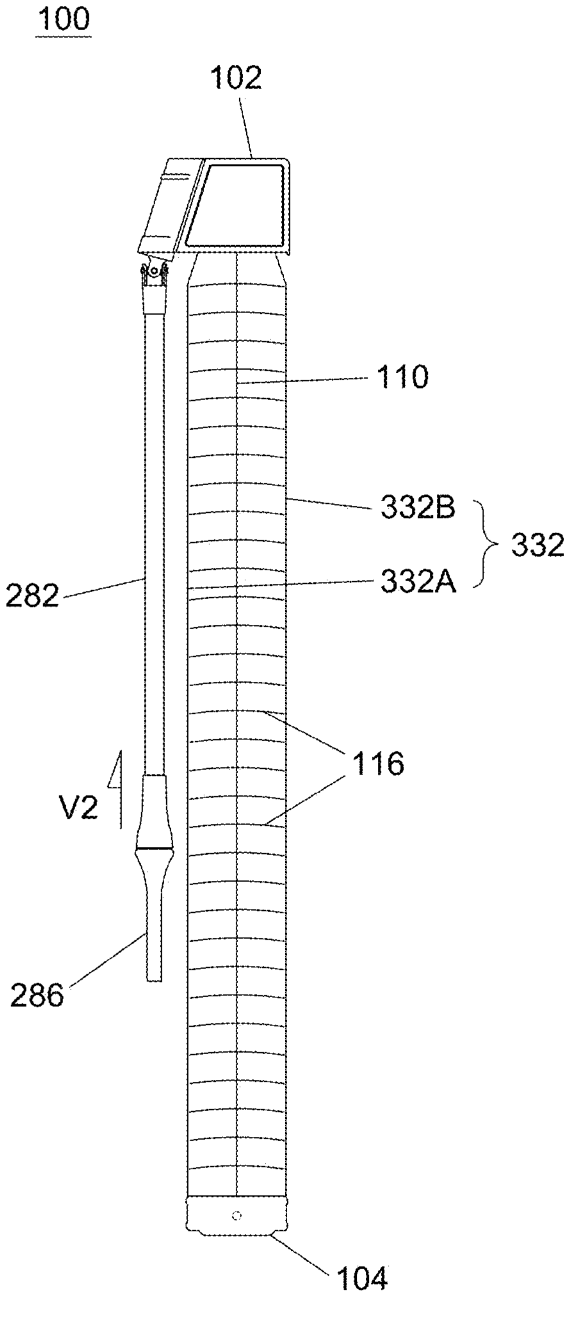
Figure 25:
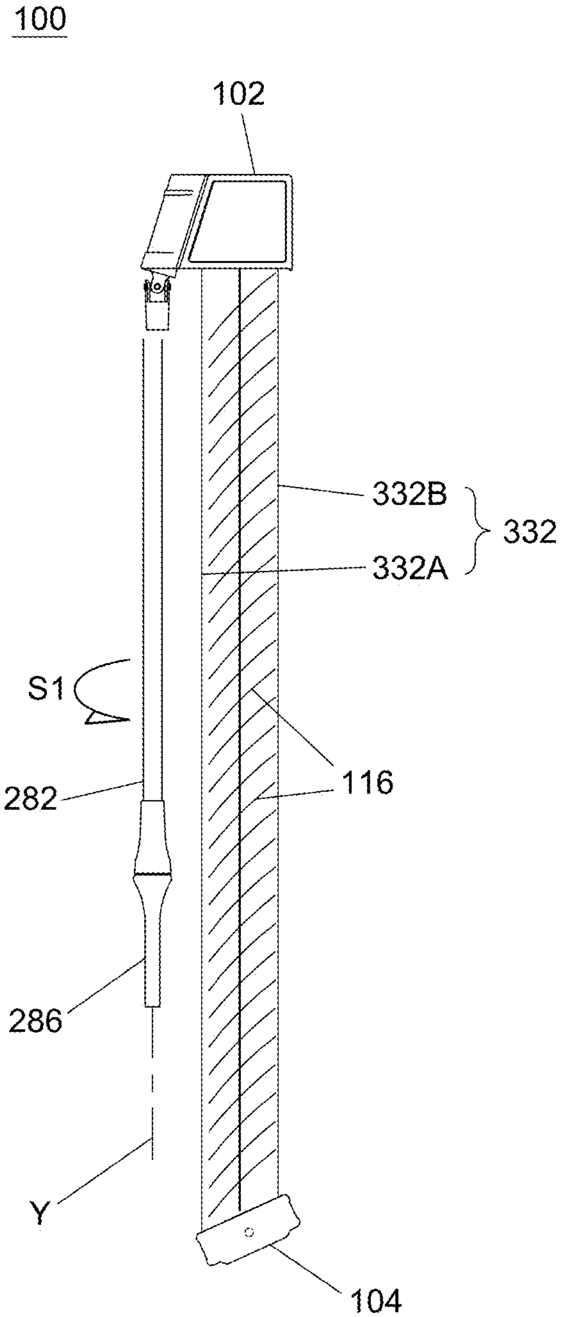
FIGS. 25 and 26 are schematic views illustrating exemplary operation for adjusting an angular position of a shading structure in the window shade shown in FIG. 22.
Figure 26:
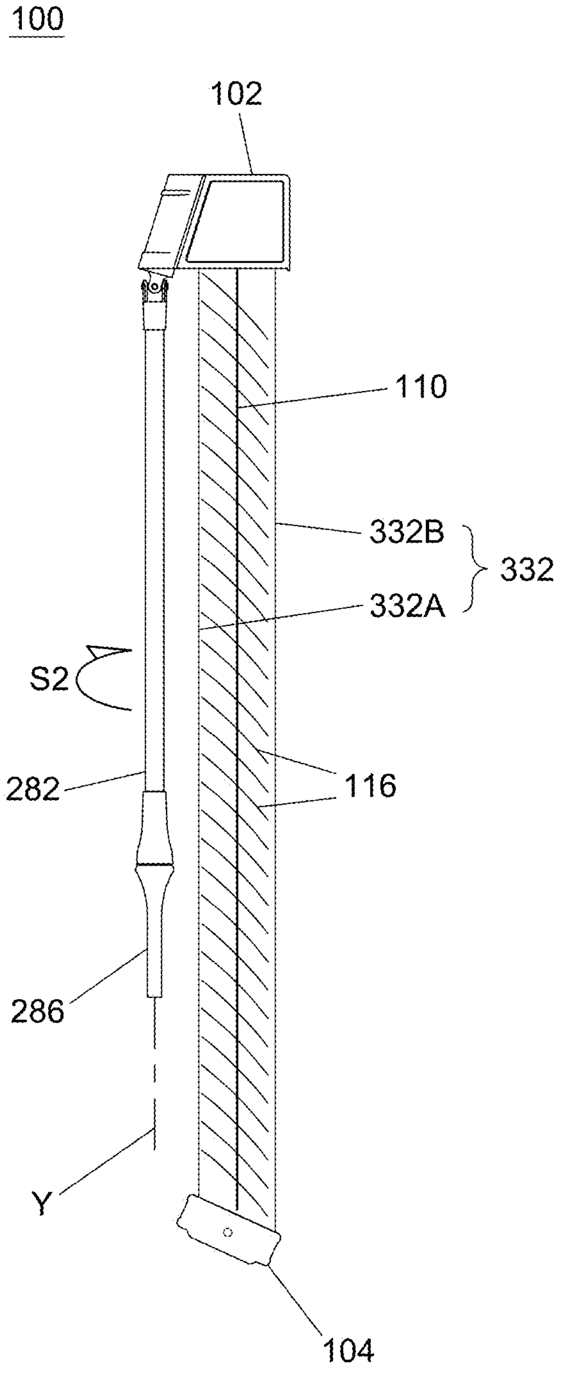

FIG. 22 is a perspective view illustrating an embodiment of the window shade 100 incorporating the actuating system 200 shown in FIG. 19, and FIGS. 23-28 are schematic views illustrating exemplary operation of the window shade 100 shown in FIG. 22. Referring to FIGS. 19-28, the window shade 100 can include the head rail 102, the movable rail 104, and the shading structure 106 disposed between the head rail 102 and the movable rail 104. Like previously described, the winding units 204 that are assembled with the head rail 102 are connected with the movable rail 104 via the suspension elements 110, whereby the movable rail 104 can be suspended from the head rail 102. The shading structure 106 can include a plurality of slats 116 that are suspended from the head rail 102 with the ladder assembly 332 of the shade tilting mechanism 330. More specifically, each of the slats 116 can be respectively connected with the two strip portions 332A and 332B of the ladder assembly 332, which respectively extend at a front and a rear of the slats 116. Accordingly, the shade tilting mechanism 330 is operable to adjust an angular position of the slats 116.

Referring to FIGS. 19-24, a user can pull the control wand 282 downward in a direction V1 for expanding the window shade 100. As described previously, this downward sliding displacement of the control wand 282 can urge the brake release part 280 to move for causing the braking part 216 to loosen the frictional contact with the brake coupling part 218. As a result, the axle coupling part 214, the brake coupling part 218, and the clutching part 244 coupled thereto can rotate concurrently for lowering the movable rail 104 by gravity action. The spool 236 and the clutching part 246 can remain generally stationary while the axle coupling part 214 rotates for lowering the movable rail 104. When the movable rail 104 moving downward reaches a desired position, the user can release the control wand 282, which can slide upward in a direction V2 to recover its initial position owing to the action of the biasing spring 318. As a result, the braking part 216 can recover the tightening state, and the movable rail 104 can be held in the desired position relative to the head rail 102.

Referring to FIGS. 19-22, 25 and 26, for adjusting an angular position of the slats 116, a user can rotate the control wand 282 about its lengthwise axis Y, which can be transmitted through the transmission assembly 340 to actuate the shade tilting mechanism 330. For example, the control wand 282 can be rotated in a direction S1 for tilting the slats 116 toward one side (shown in FIG. 25), and can be rotated in an opposite direction S2 for tilting the slats 116 toward another opposite side (shown in FIG. 26).

Figure 27:
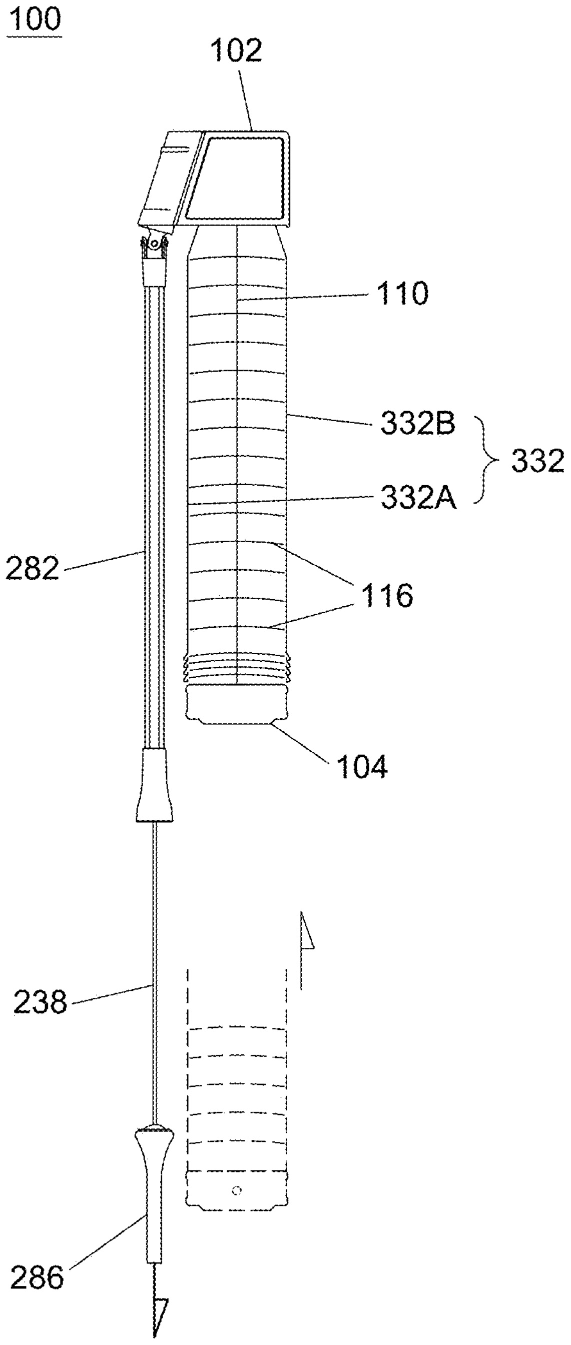
FIGS. 27 and 28 are schematic views illustrating exemplary operation for raising the movable rail of the window shade shown in FIG. 22.
Figure 28:
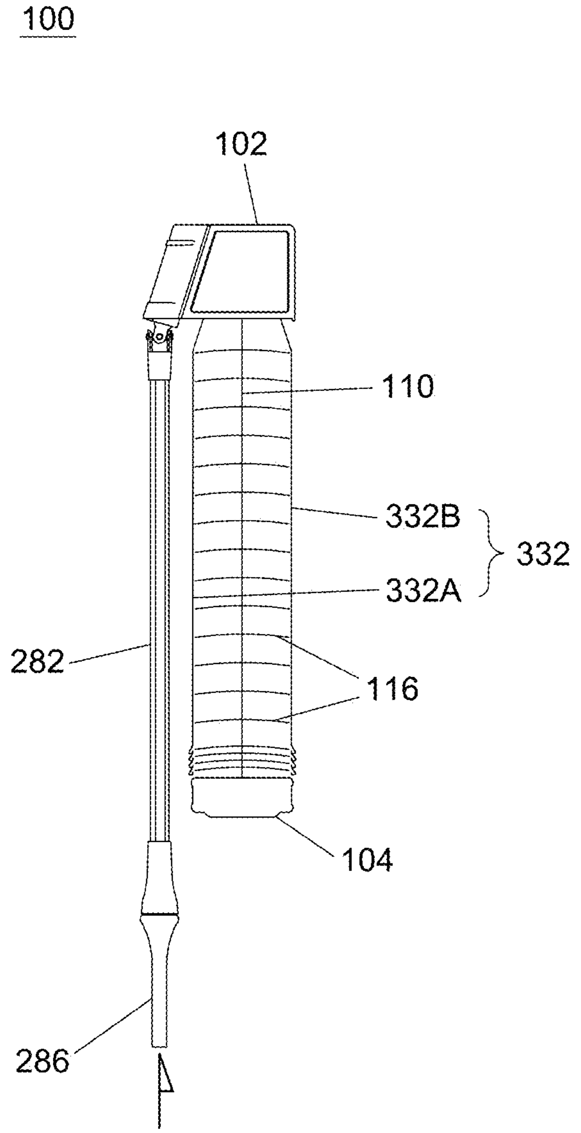

Referring to FIGS. 21, 27 and 28, for retracting the window shade 100, the movable rail 104 can be raised by pulling and releasing the handle 286 like previously described.

Advantages of the structures described herein include the ability to provide an actuating system operable to lower and raise a movable rail of a window shade with reduced effort. The actuating system includes a clutching mechanism that can reduce internal friction during operation, whereby component wear can be reduced, service life can be expanded, and operation of the actuating system can be facilitated. Moreover, the actuating system is adaptable for use with different types of window shades, which can simplify the manufacture of window shades.

Realization of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. An actuating system for a window shade, comprising:

an axle coupling part rotatable for raising and lowering a movable rail of a window shade;

a braking part and a brake coupling part connected with each other, the braking part being adapted to apply a braking force on the brake coupling part for preventing rotation of the brake coupling part;

a lift actuating module including a spool connected with an operating part, the spool being rotatable in a winding direction to wind the operating part and in an unwinding direction to unwind the operating part; and a clutching mechanism including two clutching parts movable relative to the brake coupling part and the spool to selectively couple the axle coupling part to either one of the spool and the brake coupling part, wherein the spool and the axle coupling part are concurrently rotatable relative to the brake coupling part when the axle coupling part is decoupled from the brake coupling part and coupled to the spool, and the braking force of the braking part is adapted to prevent a rotation of the axle coupling part when the axle coupling part is coupled to the brake coupling part and decoupled from the spool;

wherein the axle coupling part is decoupled from the brake coupling part and the braking part as the spool and the axle coupling part coupled to each other continuously rotate for displacing the movable rail.

2. The actuating system according to claim 1, wherein the two clutching parts are configured to slide in opposite directions to selectively couple the axle coupling part to either one of the spool and the brake coupling part.

3. The actuating system according to claim 1, wherein when the axle coupling part is decoupled from the brake coupling part and coupled to the spool, one of the two clutching parts is rotatable along with the axle coupling part and the spool while the brake coupling part and the other one of the two clutching parts remain generally stationary.

4. The actuating system according to claim 1, wherein the brake coupling part and one of the two clutching parts are disposed around an intermediate portion of the axle coupling part, and the other one of the two clutching parts is disposed adjacent to an end of the axle coupling part.

5. The actuating system according to claim 1, wherein the lift actuating module includes a spring connected with the spool, the spring biasing the spool to rotate in the winding direction.

6. The actuating system according to claim 1, wherein the two clutching parts include:

a first clutching part coupled to the brake coupling part, the first clutching part being movable relative to the brake coupling part between a first position where the first clutching part is disengaged from the axle coupling part and a second position where the first clutching part is engaged with the axle coupling part; and a second clutching part coupled to the spool, the second clutching part being movable relative to the spool between a third position where the second clutching part is disengaged from the axle coupling part and a fourth position where the second clutching part is engaged with the axle coupling part;

wherein a rotation of the spool in the unwinding direction causes the second clutching part to move to the fourth position and the first clutching part to move to the first position so that the spool, the axle coupling part and the second clutching part are concurrently rotatable relative to the brake coupling part, and a rotation of the spool in the winding direction causes the second clutching part to move to the third position, the first clutching part being switched to the second position while the second clutching part is in the third position so that the braking force of the braking part is adapted to prevent a rotation of the axle coupling part.

7. The actuating system according to claim 6, wherein the axle coupling part and the spool are rotatable about a longitudinal axis, and the first and second clutching parts are slidable along the longitudinal axis.

8. The actuating system according to claim 7, wherein the axle coupling part includes a plurality of first teeth and a plurality of second teeth disposed around the longitudinal axis, the first clutching part has a plurality of third teeth, and the second clutching part has a plurality of fourth teeth, the third teeth being engaged with the first teeth when the first clutching part is in the second position, and the fourth teeth being engaged with the second teeth when the second clutching part is in the fourth position.

9. The actuating system according to claim 8, wherein the first teeth are disposed along a first circumference of the axle coupling part, and the second teeth are disposed along a second circumference of the axle coupling part that is smaller than the first circumference.

10. The actuating system according to claim 8, wherein the first teeth and the third teeth are configured so that the first clutching part is urged to move from the second position to the first position by a rotation of the spool and the axle coupling part coupled to each other via the second clutching part.

11. The actuating system according to claim 8, wherein the second clutching part is coupled to the spool via a sliding connection configured so that a rotation of the spool in the unwinding direction causes the second clutching part to slide toward the axle coupling part to the fourth position for engaging the fourth teeth with the second teeth, and a rotation of the spool in the winding direction causes the second clutching part to slide away from the axle coupling part to the third position for disengaging the fourth teeth from the second teeth.

12. The actuating system according to claim 6, wherein the first clutching part is movable between the first position and the second position in sliding contact with the brake coupling part.

13. The actuating system according to claim 12, wherein the brake coupling part has a hollow interior adapted to receive at least partially the first clutching part, and the first clutching part is in sliding contact with the brake coupling part inside the hollow interior via at least one ramp surface provided on the first clutching part or the brake coupling part.

14. The actuating system according to claim 13, wherein the first clutching part has a notch including a first ramp surface and a first stop surface, and the brake coupling part has an inner wall provided with a protrusion having a second ramp surface and a second stop surface, the first clutching part being movable relative to the brake coupling part with the first ramp surface in sliding contact with the second ramp surface, and the braking force of the braking part being adapted to prevent a rotation of the axle coupling part via a contact between the first stop surface and the second stop surface.

15. The actuating system according to claim 1, wherein the braking part is disposed around the brake coupling part and is connected with a brake release part, the braking part being adapted to apply the braking force on the brake coupling part via a frictional contact between the braking part and the brake coupling part, and the brake release part is movable to cause the braking part to loosen the frictional contact with the brake coupling part.

16. The actuating system according to claim 15, further comprising a control wand connected with the brake release part via a transmission assembly, the control wand being operable to urge the brake release part to move for causing the braking part to loosen the frictional contact with the brake coupling part.

17. The actuating system according to claim 16, further comprising a shade tilting mechanism operable to adjust an angular position of a shading structure of a window shade, the control wand being connected with the shade tilting mechanism via a second transmission assembly, wherein the control wand is slidable to urge the brake release part to move for causing the braking part to loosen the frictional contact with the brake coupling part, and the control wand is rotatable to actuate the shade tilting mechanism.

18. The actuating system according to claim 17, wherein the axle coupling part is rotationally coupled to a transmission axle, and the shade tilting mechanism includes a rotary wheel and a ladder assembly connected with each other, the rotary wheel being rotatable about the transmission axle and connected with the control wand via the second transmission assembly.

19. A window shade comprising:

a head rail, a movable rail, and a shading structure including a plurality of slats disposed between the head rail and the movable rail;

a winding unit assembled with the head rail, the winding unit being connected with the movable rail via a suspension element; and the actuating system according to claim 17, wherein the axle coupling part is rotationally coupled to the winding unit via a transmission axle, and the shade tilting mechanism is connected with the slats, whereby the axle coupling part and the transmission axle are rotatable in unison for raising and lowering the movable rail, and the shade tilting mechanism is operable to adjust an angular position of the slats.

20. A window shade comprising:

a head rail, a movable rail, and a shading structure disposed between the head rail and the movable rail;

a winding unit assembled with the head rail, the winding unit being connected with the movable rail via a suspension element; and the actuating system according to claim 1, wherein the axle coupling part is rotationally coupled to the winding unit via a transmission axle, whereby the axle coupling part and the transmission axle are rotatable in unison for raising and lowering the movable rail.

* * * * *